US012658595B2

(12) United States Patent
Pan et al.

(10) Patent No.: US 12,658,595 B2
(45) Date of Patent: Jun. 16, 2026

(54) PASSIVE METASURFACE FOR INTERACTING WITH ELECTROMAGNETIC SIGNALS

(71) Applicant: Microsoft Technology Licensing, LLC, Redmond, WA (US)

(72) Inventors: Hao Pan, Shanghai (CN); Lili Qiu, Shanghai (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 113 days.

(21) Appl. No.: 18/608,421

(22) Filed: Mar. 18, 2024

(65) Prior Publication Data

US 2024/0313414 A1 Sep. 19, 2024

Related U.S. Application Data

(60) Provisional application No. 63/453,057, filed on Mar. 17, 2023.

(51) Int. Cl.
H01Q 3/26 (2006.01)
B82Y 15/00 (2011.01)
(Continued)

(52) U.S. Cl.
CPC .......... H01Q 15/0086 (2013.01); B82Y 15/00 (2013.01); G10K 11/36 (2013.01);
(Continued)

(58) Field of Classification Search
CPC .......... H01Q 1/2208; H01Q 1/24; H01Q 7/00; H04B 5/48; H04B 5/26; H04B 5/77
See application file for complete search history.

(56) References Cited

U.S. PATENT DOCUMENTS

2020/0021034 A1*  1/2020  Ko ........................ H01Q 19/06
2020/0304090 A1   9/2020  Urzhumov
(Continued)

FOREIGN PATENT DOCUMENTS

CN    107016989 A    8/2017
CN    107863097 A    3/2018
(Continued)

OTHER PUBLICATIONS

"Ansys HFSS Best-In-Class 3D High Frequency Electromagnetic Simulation Software", Retrieved From: https://web.archive.org/web/20220816090932/https:/www.ansys.com/products/electronics/ansys-hfss, Jul. 2022, 6 Pages.
(Continued)

*Primary Examiner* — David E Lotter
(74) *Attorney, Agent, or Firm* — Holzer Patel Drennan

(57) ABSTRACT

A method jointly optimizes a passive metasurface and a multiple input multiple output (MIMO) antenna array to achieve dynamic adaptation and high RSS. The passive metasurface consists of one or more conductive layers and dielectric layers. The metasurface supports dual band communication. For the uplink, the outgoing signals is generated by jointly optimizing antenna array and metasurface design. For the downlink, the designed metasurface is used together with incident-angle-insensitive meta cells to effectively combine arriving signals at the receiving antennas from all incident angles.

20 Claims, 9 Drawing Sheets

(51) Int. Cl.

| | | |
|---|---|---|
| *G10K 11/36* | (2006.01) | |
| *H01Q 1/38* | (2006.01) | |
| *H01Q 3/46* | (2006.01) | |
| *H01Q 15/00* | (2006.01) | |
| *H01Q 21/06* | (2006.01) | |

(52) U.S. Cl.
CPC ................. *H01Q 1/38* (2013.01); *H01Q 3/46* (2013.01); *H01Q 21/065* (2013.01)

(56) References Cited

U.S. PATENT DOCUMENTS

| | | | |
|---|---|---|---|
| 2021/0184351 A1* | 6/2021 | Eleftheriades | ....... H01Q 3/2658 |
| 2021/0195332 A1 | 6/2021 | Subramanian | |
| 2022/0006511 A1 | 1/2022 | Esfahlani et al. | |
| 2022/0180853 A1 | 6/2022 | Memoli | |

FOREIGN PATENT DOCUMENTS

| | | | |
|---|---|---|---|
| CN | 112636001 A | 4/2021 | |
| CN | 114879233 A | 8/2022 | |
| CN | 114913841 A | 8/2022 | |
| CN | 116524893 A | 8/2023 | |
| CN | 117807774 A | 4/2024 | |
| GB | 2599256 A | 3/2022 | |
| WO | 2022094686 A1 | 5/2022 | |
| WO | 2022169448 A1 | 8/2022 | |
| WO | 2024196856 A1 | 9/2024 | |
| WO | 2024196866 A1 | 9/2024 | |

OTHER PUBLICATIONS

"APMS-ULN Models—Multi-Channel Signal Generator up to 40 GHz", Retrieved from: https://web.archive.org/web/20220520203229/https://www.anapico.com/products/rf-signal-generators/multi-channel-analog-and-digital-signal-generator/apms-models-multi-channel-signal-generators-up-to-40-ghz/, May 20, 2022, 6 Pages.

"AWS Ground Station", Retrieved From: https://aws.amazon.com/ground-station/, Nov. 7, 2022, 9 Pages.

"Federal Communications Commission", Retrieved from: https://docs.fcc.gov/public/attachments/FCC-20-102A1.pdf, Jul. 30, 2020, 24 Pages.

"Genetic Algorithm", Retrieved From: https://web.archive.org/web/20220831214030/https:www.mathworks.com/help/gads/what-is-the-genetic-algorithm.html, Aug. 31, 2022, 2 Pages.

"LEO Azimuth Tracking!", Retrieved From: https://web.archive.org/web/20220210012022/http:/aprs.org/LEO-tracking.html, Feb. 10, 2020, 2 Pages.

"Maxintalratio combining", Retrieved from: https://en.wikipedia.org/w/index.php?title=Maximal-ratio_combining&oldid=1114023182, Dec. 8, 2022, 1 Pages.

"Phoenix CubeSat", Retrieved from: http://phxcubesat.asu.edu/, Nov. 2, 2019, 9 Pages.

Qin, et al. "Realization of an Ultra-Thin Metasurface to Facilitate Wide Bandwidth, Wide Angle Beam Scanning", In Journal of Scientific Reports, vol. 8, Issue 1, Mar. 19, 2018, 11 Pages.

"SatNOGS", Retrieved from : https://web.archive.org/web/20221205043852/https:/satnogs.org/, Dec. 5, 2022, 2 Pages.

"Statista", Retrieved from: https://www.statista.com/statistics/617136/digital-population-worldwide/, Sep. 20, 2022, 3 Pages.

Arun, et al., "RFocus: Beamforming Using Thousands of Passive Antennas", In Proceedings of 17th USENIX Symposium on Networked Systems Design and Implementation, Feb. 25, 2020, pp. 1047-1061.

Chen, et al., "Pushing the Physical Limits of IoT Devices with Programmable Metasurfaces", In Proceedings of 18th USENIX Symposium on Networked Systems Design and Implementation, Apr. 12, 2021, pp. 425-438.

Cho, et al., "mmWall: A Reconfigurable Metamaterial Surface for Mmwave Networks", In Proceedings of the 22nd International Workshop on Mobile Computing Systems and Applications, Feb. 24, 2021, pp. 118-124.

Cho, et al., "Towards Dual-band Reconfigurable Metamaterial Surfaces for Satellite Networking", In Repository of arXiv:2206.14939v1, Jun. 29, 2022, 9 Pages.

Coffey, Joseph, "Latency in Optical Fiber Systems", In White Paper of Commscope, Oct. 24, 2022, 7 Pages.

Feng, et al., "A Wideband Antenna Using Metasurface for the 2g/3g/lte/5g Communications", In Journal of Microwave and Optical Technology Letters, vol. 60, Issue 10, Oct. 2018, pp. 2484-2487.

Francis, Allen, "1 in 3 People Around the World have Never used the Internet, a u.n. Report Estimates", Retrieved From: https://www.washingtonpost.com/world/2021/12/01/global-internet-usage/, Dec. 1, 2021, 2 Pages.

Giannoni, et al., "The Fermat Principle in General Relativity and Applications", In Journal of Mathematical Physics, vol. 43, Issue 1, Jun. 25, 1999, 42 Pages.

Huang, et al., "Reconfigurable Metasurface for Multifunctional Control of Electromagnetic Waves", In Journal of Advanced Optical Materials, vol. 5, Issue 22, Nov. 5, 2017, 6 Pages.

Handley, et al., "Delay is Not an Option: Low Latency Routing in Space", In Proceedings of the 17th ACM Workshop on Hot Topics in Networks, Nov. 15, 2018, 7 Pages.

Hosseininejad, et al., "Digital Metasurface Based on Graphene: An Application to Beam Steering in Terahertz Plasmonic Antennas", In Proceedings of IEEE Transactions on Nanotechnology, Jun. 25, 2019, pp. 734-746.

Hu, et al., "Reconfigurable Intelligent Surface Based RF Sensing: Design, Optimization, and Implementation", In Proceedings of IEEE Journal on Selected Areas in Communications, vol. 38, Issue 11, Jul. 3, 2020, pp. 2700-2716.

Hynes, Cara., "SpaceX Starlink Internet Review 2022: Should You Get It?", Retrieved from: https://www.satelliteinternet.com/providers/starlink/#Internet_fees, Nov. 21, 2022, 23 Pages.

Korte, et al., "Combinatorial Optimization", In Publication of Springer, 2011, 701 Pages.

Lai, et al., "Cooperatively Constructing Cost-Effective Content Distribution Networks upon Emerging Low Earth Orbit Satellites and Clouds", In Proceedings of IEEE 29th International Conference on Network Protocols, Nov. 1, 2021, 12 Pages.

Lai, et al., "OrbitCast: Exploiting Mega-Constellations for Low-Latency Earth Observation", In Proceedings of IEEE 29th International Conference on Network Protocols, Nov. 1, 2021, 12 Pages.

Lima, et al., "Circular Polarization Wide-Angle Beam Steering at Ka-Band by in-Plane Translation of a Plate Lens Antenna", In Journal of IEEE Transactions on Antennas and Propagation, vol. 63, Issue 12, Oct. 1, 2015, pp. 5443-5455.

Ma, et al., "Dual-Band Light Focusing Using Stacked Graphene Metasurfaces", In Journal of ACS Photonics, vol. 4, Issue 7, Jul. 19, 2017, pp. 1770-1775.

Malfajani, et al., "Design and Implementation of a Dual-Band Single Layer Reflectarray in X and K Bands", In Journal of IEEE Transactions on Antennas and Propagation vol. 62, Issue 8, May 29, 2014, pp. 4425-4431.

Mcwhirter, et al., "An EVD Algorithm for Para-Hermitian Polynomial Matrices", In Journal of IEEE Transactions on Signal Processing vol. 55, Issue 5, Apr. 23, 2007, pp. 2158-2169.

Qu, et al., "Single-Layer Dual-Band Reflectarray with Single Linear Polarization", In Journal of IEEE Transactions on Antennas and Propagation vol. 62, Issue 1, Oct. 28, 2013, pp. 199-205.

Quian, et al., "MilliMirror: 3D Printed Reflecting Surface for Millimeter-Wave Coverage Expansion", In Proceedings of the 28th Annual International Conference on Mobile Computing and Networking, Oct. 14, 2022, pp. 15-28.

Saifullah, et al., "Dual-Band Multi-Bit Programmable Reflective Metasurface Unit Cell: Design and Experiment", In Journal of Optics Express, vol. 29, Issue 2, Jan. 18, 2021, pp. 2658-2668.

Santos, et al., "Development of a Low-Cost Ground Segment Capable of Receiving Data from Nanosatellites: A Partnership Between Brazil and Portugal", In Proceedings of 4th Symposium on Space Educational Activities, Apr. 29, 2022, 6 Pages.

(56)                 References Cited

OTHER PUBLICATIONS

Singh, et al., "A Community-Driven Approach to Democratize Access to Satellite Ground Stations", In Journal of GetMobile: Mobile Computing and Communications, vol. 26, Issue 1, May 27, 2022, 14 Pages.

Tan, et al., "Enabling Indoor Mobile Millimeter-wave Networks Based on Smart Reflect-arrays", In Proceedings of IEEE Conference on Computer Communications, Apr. 16, 2018, pp. 270-278.

Tang, et al., "MIMO Transmission Through Reconfigurable Intelligent Surface: System Design, Analysis, and Implementation", In IEEE Journal on Selected Areas in Communications vol. 38, Issue 11, Jul. 3, 2020, pp. 2683-2699.

Vasisht, et al., "L2D2: Low Latency Distributed Downlink for Low Earth Orbit Satellites", In Proceedings of the 2021 ACM SIGCOMM 2021 Conference, Aug. 9, 2021, pp. 151-164.

Wang, et al., "Optically Reconfigurable Metasurfaces and Photonic Devices Based on Phase Change Materials", In Journal of Nature photonics, vol. 10, Issue 1, Jan. 10, 2011, pp. 60-65.

Ye, et al., "Nonterrestrial Communications Assisted by Reconfigurable Intelligent Surfaces", In Proceedings of IEEE, vol. 110, Issue 9, May 11, 2022, pp. 1423-1465.

Zelaya, "Lava: Fine-Grained 3D Indoor Wireless Coverage for Small IoT Devices", In Proceedings of the ACM SIGCOMM 2021 Conference, Aug. 9, 2021, pp. 123-136.

Zhang, et al., "Ultrathin Dual-Mode Vortex Beam Generator Based on Anisotropic Coding Metasurface", In Journal of Scientific Reports, vol. 11, Issue 1, Mar. 11, 2021, 8 Pages.

Zheng, et al., "Intelligent Reflecting Surface-Aided LEO Satellite Communication: Cooperative Passive Beamforming and Distributed Channel Estimation", In IEEE Journal on Selected Areas in Communications, vol. 40, Issue 10, Aug. 3, 2022, pp. 3057-3070.

Han, et al., "Dual-Band Metasurface for Broadband Asymmetric Transmission with High Efficiency", In Journal of Applied Physics, vol. 130, Issue 3, Jul. 21, 2021, 8 Pages.

Foo, et al., "Metamaterial-based Transmitarray for orthogonal-beam-space massive-MIMO," In 2016 10th European Conference on Antennas and Propagation (EuCAP), Apr. 10, 2016, 5 pages.

International Search Report and Written Opinion received for PCT Application No. PCT/US2024/020407, Jul. 9, 2024, 18 pages.

International Search Report and Written Opinion received for PCT Application No. PCT/US2024/20394, Jun. 21, 2024, 16 pages.

Pham, et al., "Dual-band transmitarrays with dual-linear polarization at Ka-band," IEEE Transactions on Antennas and Propagation, vol. 65, Issue No. 12, Dec. 2017, pp. 7009-7018.

International Preliminary Report on Patentability (Chapter I) received for PCT Application No. PCT/US2024/020394, mailed on Oct. 2, 2025, 10 pages.

International Preliminary Report on Patentability (Chapter I) received for PCT Application No. PCT/US2024/020407, mailed on Oct. 2, 2025, 12 pages.

Notice of Allowance mailed on Oct. 9, 2025, in U.S. Appl. No. 18/608,487 7 pages.

* cited by examiner

Input Port (Floquetport)

Periodic Boundary Conditions (PBCs)

Output Port (Floquetport)

(a) 3D view
500

$L$ $L_D$ $R_\theta$ $L_1$ $L_2$ $L_U$ (b) Top view
502

(c) Bottom view
504

Metal layers
512

Aperture
514

Substrate
510

Airgap
508

$H_1$ $H_2$ (d) Side view
506

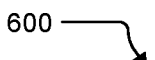

Execute a search to tune physical dimensions and distribution of meta-atoms distributed in the passive metasurface with respect to a plurality of predefined input signal property sets of the electromagnetic signal to provide a tuned propagation profile of the meta-atoms in aggregate
602

Form the meta-atoms with the physical dimensions and the distribution determined by the search in one or more conductive layers and one or more dielectric substrates of the passive metasurface
604

FIG. 6

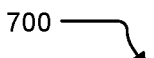

Execute a search to tune physical dimensions and distribution of propagation elements of meta-atoms distributed in the passive metasurface with respect to a plurality of predefined input signal property sets of the electromagnetic signal to provide a tuned propagation profile of the meta-atoms in aggregate

702

Form the propagation elements of the meta-atoms with the physical dimensions and the distribution determined by the search in one or more conductive layers and one or more dielectric substrates of the passive metasurface

800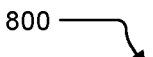

Receive the electromagnetic signal with input signal properties at the passive metasurface, wherein the input signal properties conform with a predefined input signal property set of a plurality of predefined input signal property sets
802

Modulate incoming electromagnetic wavefronts of the electromagnetic signal with propagation elements of meta-atoms formed in one or more conductive layers and one or more dielectric substrates of the passive metasurface
804

FIG. 8

PASSIVE METASURFACE FOR INTERACTING WITH ELECTROMAGNETIC SIGNALS

CROSS-REFERENCE TO OTHER APPLICATIONS

The present application claims priority to U.S. Provisional Patent No. 63/453,057, entitled "Adaptive Metasurface for Low Earth Orbit Satellite Communications and Acoustic Sensing and Communication" and filed on Mar. 17, 2023, which is specifically incorporated by reference for all that it discloses and teaches.

This application is also related to U.S. application Ser. No. 18/608,487, entitled "Acoustic Sensing and Communication Using a Metasurface" and filed concurrently herewith, which is specifically incorporated herein by reference for all that it discloses and teaches.

BACKGROUND

Many aspects of modern life rely on wireless network connectivity, including, without limitation, communications through local Wi-Fi-based networks in homes and workplaces and mobile/cellular networks (e.g., based on 4G and 5G ground stations). Low Earth Orbit (LEO) satellite communication can provide expansion of such networks and is growing in its application and adoption, at least in part because it has a large coverage areas including coverage to remote areas and offers high bandwidth, and low propagation latency properties.

SUMMARY

In some aspects, the techniques described herein relate to a method of designing a passive metasurface for interacting with an electromagnetic signal received at the passive metasurface from an electromagnetic signal transmitter, the method including: executing a search to tune physical dimensions and distribution of meta-atoms distributed in the passive metasurface with respect to a plurality of predefined input signal property sets of the electromagnetic signal to provide a tuned propagation profile of the meta-atoms in aggregate; and forming the meta-atoms of the meta-atoms with the physical dimensions and the distribution determined by the search in one or more conductive layers and one or more dielectric substrates of the passive metasurface, each meta-atom being configured to modulate incoming electromagnetic wavefronts of the electromagnetic signal received by the meta-atom to form corresponding outgoing electromagnetic wavefronts of the electromagnetic signal exiting the passive metasurface, wherein the tuned propagation profile of the meta-atoms in aggregate supports the plurality of predefined input signal property sets of the incoming electromagnetic wavefronts and, for each input signal property set, the physical dimensions and the distribution of the meta-atoms are tuned according to the tuned propagation profile to modulate the incoming electromagnetic wavefronts to generate a predefined beam pattern of the electromagnetic signal exiting the passive metasurface corresponding to the input signal property set.

In some aspects, the techniques described herein relate to a passive metasurface system for interacting with an electromagnetic signal received at the passive metasurface from an electromagnetic signal transmitter, the passive metasurface system including: a passive metasurface designed by executing a search to tune physical dimensions and distribution of meta-atoms distributed in the passive metasurface with respect to a plurality of predefined input signal property sets of the electromagnetic signal to provide a tuned propagation profile of the meta-atoms in aggregate, and manufactured by forming the meta-atoms of the meta-atoms with the physical dimensions and the distribution determined by the search in one or more conductive layers and one or more dielectric substrates of the passive metasurface, each meta-atom being configured to modulate incoming electromagnetic wavefronts of the electromagnetic signal received by the meta-atom to form corresponding outgoing electromagnetic wavefronts of the electromagnetic signal exiting the passive metasurface, wherein the tuned propagation profile of the meta-atoms in aggregate supports the plurality of predefined input signal property sets of the incoming electromagnetic wavefronts and, for each input signal property set, the physical dimensions and the distribution of the meta-atoms are tuned according to the tuned propagation profile to modulate the incoming electromagnetic wavefronts to generate a predefined beam pattern of the electromagnetic signal exiting the passive metasurface corresponding to the input signal property set.

In some aspects, the techniques described herein relate to one or more tangible processor-readable storage media embodied with instructions for executing on one or more processors and circuits of a computing device a process for designing a passive metasurface for interacting with an electromagnetic signal received at the passive metasurface from an electromagnetic signal transmitter, the process including: executing a search to tune physical dimensions and distribution of meta-atoms distributed in the passive metasurface with respect to a plurality of predefined input signal property sets of the electromagnetic signal to provide a tuned propagation profile of the meta-atoms in aggregate; and forming the meta-atoms of the meta-atoms with the physical dimensions and the distribution determined by the search in one or more conductive layers and one or more dielectric substrates of the passive metasurface, each meta-atom being configured to modulate incoming electromagnetic wavefronts of the electromagnetic signal received by the meta-atom to form corresponding outgoing electromagnetic wavefronts of the electromagnetic signal exiting the passive metasurface, wherein the tuned propagation profile of the meta-atoms in aggregate supports the plurality of predefined input signal property sets of the incoming electromagnetic wavefronts and, for each input signal property set, the physical dimensions and the distribution of the meta-atoms are tuned according to the tuned propagation profile to modulate the incoming electromagnetic wavefronts to generate a predefined beam pattern of the electromagnetic signal exiting the passive metasurface corresponding to the input signal property set.

In some aspects, the techniques described herein relate to a method of manufacturing a passive metasurface for interacting with an electromagnetic signal received at the passive metasurface from an electromagnetic signal transmitter, the method including: executing a search to tune physical dimensions and distribution of propagation elements of meta-atoms distributed in the passive metasurface with respect to a plurality of predefined input signal property sets of the electromagnetic signal to provide a tuned propagation profile of the meta-atoms in aggregate; and forming the propagation elements of the meta-atoms with the physical dimensions and the distribution determined by the search in one or more conductive layers and one or more dielectric substrates of the passive metasurface, each propagation element being configured to modulate incoming electromagnetic wavefronts of the electromagnetic signal received by the propagation element to form corresponding outgoing electromagnetic wavefronts of the electromagnetic signal exiting the passive metasurface, wherein the tuned propagation profile of the meta-atoms in aggregate supports the plurality of predefined input signal property sets of the incoming electromagnetic wavefronts and, for each input signal property set, the physical dimensions and the distribution of the propagation elements are tuned according to the tuned propagation profile to modulate the incoming electromagnetic wavefronts to generate a predefined beam pattern of the electromagnetic signal exiting the passive metasurface corresponding to the input signal property set.

In some aspects, the techniques described herein relate to a passive metasurface for interacting with an electromagnetic signal received at the passive metasurface from an electromagnetic signal transmitter, the passive metasurface including: one or more dielectric substrates; one or more conductive layers applied to each of the one or more dielectric substrates; and meta-atoms distributed in the passive metasurface to provide a tuned propagation profile of the meta-atoms in aggregate, each meta-atom including at least a portion of a propagation element formed in the one or more conductive layers and the one or more dielectric substrates, each propagation element interacting with the electromagnetic signal to modulate incoming electromagnetic wavefronts of the electromagnetic signal received by the propagation element to form corresponding outgoing electromagnetic wavefronts of the electromagnetic signal exiting the passive metasurface, wherein the tuned propagation profile of the meta-atoms in aggregate supports a plurality of predefined input signal property sets of the incoming electromagnetic wavefronts and, for each input signal property set, physical dimensions and distribution of the propagation elements in the passive metasurface are tuned according to the tuned propagation profile to modulate the incoming electromagnetic wavefronts to generate a predefined beam pattern of the electromagnetic signal exiting the passive metasurface corresponding to the input signal property set.

In some aspects, the techniques described herein relate to a method of using a passive metasurface for interacting with an electromagnetic signal received at the passive metasurface from an electromagnetic signal transmitter, the method including: receiving the electromagnetic signal with input signal properties at the passive metasurface, wherein the input signal properties conform with a predefined input signal property set of a plurality of predefined input signal property sets; and modulating incoming electromagnetic wavefronts of the electromagnetic signal with propagation elements of meta-atoms formed in one or more conductive layers and one or more dielectric substrates of the passive metasurface, wherein each propagation element has physical dimensions and distribution in the passive metasurface, each propagation element being configured to modulate incoming electromagnetic wavefronts of the electromagnetic signal received by the propagation element to form corresponding outgoing electromagnetic wavefronts of the electromagnetic signal exiting the passive metasurface, wherein tuned propagation profile of the meta-atoms in aggregate supports the plurality of predefined input signal property sets of the incoming electromagnetic wavefronts and, for each input signal property set, the physical dimensions and the distribution of the propagation elements are tuned according to the tuned propagation profile to modulate the incoming electromagnetic wavefronts to generate a predefined beam pattern of the electromagnetic signal exiting the passive metasurface corresponding to the input signal property set.

In some aspects, the techniques described herein relate to a passive metasurface for interacting with an electromagnetic signal received at the passive metasurface from an electromagnetic signal transmitter, the passive metasurface including: one or more dielectric substrates; one or more conductive layers applied to each of the one or more dielectric substrates; and meta-atoms distributed in the passive metasurface to provide a tuned propagation profile of the meta-atoms in aggregate, each meta-atom including at least a portion of a propagation element formed in the one or more conductive layers and the one or more dielectric substrates, each propagation element interacting with the electromagnetic signal to modulate incoming electromagnetic wavefronts of the electromagnetic signal received by the propagation element to form corresponding outgoing electromagnetic wavefronts of the electromagnetic signal exiting the passive metasurface, wherein the tuned propagation profile of the meta-atoms in aggregate supports a plurality of predefined input signal property sets of the incoming electromagnetic wavefronts and, for each input signal property set, physical dimensions and distribution of the propagation elements in the passive metasurface are tuned according to the tuned propagation profile to modulate the incoming electromagnetic wavefronts to generate a predefined beam pattern of the electromagnetic signal exiting the passive metasurface corresponding to the input signal property set, wherein the physical dimensions and the distribution of the propagation elements in the passive metasurface are tuned according to a search executed to jointly optimize the tuned propagation profile of the meta-atoms in relation to a codebook of a phased array functioning as the electromagnetic signal transmitter or an electromagnetic receiver. This summary is provided to introduce a selection of concepts in a simplified form. The concepts are further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTION OF THE DRAWINGS

FIG. 6 illustrates example operations for designing a passive metasurface to interact with an electromagnetic signal received at the passive metasurface from an electromagnetic signal transmitter.

FIG. 7 illustrates example operations for manufacturing a passive metasurface to interact with an electromagnetic signal received at the passive metasurface from an electromagnetic signal transmitter.

FIG. 8 illustrates example operations for using a passive metasurface to interact with an electromagnetic signal received at the passive metasurface from an electromagnetic signal transmitter.

DETAILED DESCRIPTION

Figure 1:
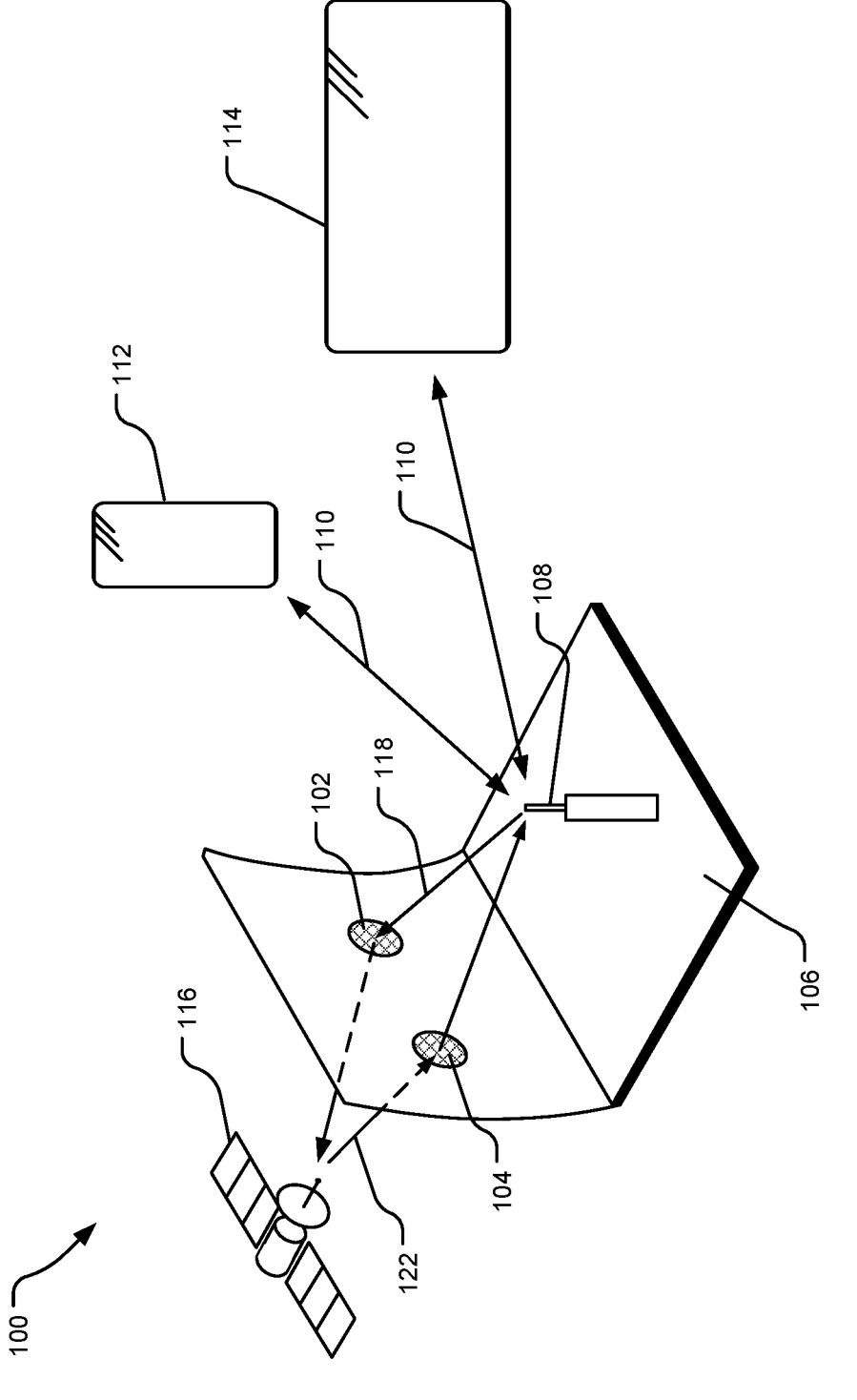
FIG. 1 illustrates an example operational environment for a passive metasurface.

The term "Low Earth Orbit satellite" generally refers to a man-made satellite that orbits the Earth below an altitude of 2,000 km (1,200 mi), although the limiting altitude may change as technology changes. LEO satellite communications typically combine ground stations and satellites to provide extensive regional or global coverage, with the satellites typically acting as intermediate communication points between various communication nodes, such as ground stations, access points, and/or user equipment. For example, a mobile phone network may communicate among various ground stations, which in turn can communicate amongst themselves via one or more satellites. In other implementations, user equipment (e.g., mobile phones) and/or communication access points can also communicate directly with the ground stations and/or satellites.

A major challenge in designing LEO ground stations is to manage issues with low received signal strength (RSS) and continuous LEO satellite movement in orbit. Furthermore, ground stations and user equipment may also be moving relative to each other, such as when located within a moving vehicle. To address these challenges, a described communication system employs a passive metasurface with a specially-designed distribution of different meta-atoms (also referred to as metasurface cells, meta-cells, and unit cells) that interacts with one or more MIMO antenna arrays to achieve dynamic adaptation, providing high RSS and accommodating the relative movement of communication nodes.

Satellite communications (SATCOM) plays an important role in the global telecommunications system. SATCOM systems use artificial satellites to provide communication links between any points on the Earth. For example, SATCOM systems are often aimed at expanding Internet access for users in remote areas. However, nearly three billion people worldwide (e.g., 37% of the world's population) still have no Internet access. LEO satellite communication is a promising way to provide Internet access to remote areas owing to its global coverage. LEO satellites are able to provide reliable network connectivity almost anywhere on the Earth, including the passengers on board ships or aircraft. Compared with Geostationary (GEO) satellites and middle Earth orbit (MEO) satellites, LEO satellites tend to revolve in orbit at an altitude of 250~1000 km from the Earth's surface. Due to their proximity to the Earth, LEO satellites have a low propagation delay among satellite-to-ground communications. Additionally, the high bandwidth and low propagation latency properties of LEO satellite communication are appealing to latency-sensitive applications, such as video conferences, industrial remote control, cloud gaming, etc.

Note that the electromagnetic (EM) signal waves in the inter-satellite communication link can travel at nearly the speed of light, while light travels about 31% slower through fiber optic cables than it travels through a vacuum. Therefore, the LEO satellite communication system can provide a low end-to-end latency (around 20 ms). Considering latency-sensitive applications, such as video conferencing, cloud gaming, and remote control, the LEO satellite communication system employing the described technology can achieve better performance than existing terrestrial fiber optic networks at distances greater than 3000 km. In addition, the close proximity of LEO satellites to the Earth also makes it possible to use high-frequency wireless links (e.g., Ku-band, Ka-band, or even THz), which can offer high data rates.

Some LEO ground stations use bulky parabolic-dish antennas to improve the received signal strength (RSS) from the LEO satellite. However, because LEO satellites are constantly moving, the ground station would likely require a tracking mechanism to continuously adapt the orientation of the parabolic-dish antenna to the satellite's current position. Such a parabolic-dish antenna with a complex tracking mechanism is bulky, expensive, and time-consuming to deploy. Alternatively, an antenna array is an alternative implementation for a LEO ground receiver—it realizes electronic steering by rapidly adjusting its beam pattern on the fly without any physical movement. But, in order to achieve high-resolution beam steering, an antenna array requires a large number of antennas and an expensive RF front end, which incurs very high costs. In contrast, the described technology employs a passive metasurface that has been specially designed to interact with a gateway antenna having RX and/or TX phased array antennas to steer electromagnetic signals.

While the LEO satellite communication system has many advantages, it poses the following significant challenges:

(1) The satellite-earth link is power-limited and has low SNR, which significantly limits its data rates.

(2) As LEO satellites move rapidly, the ground station tracks the satellites that are rapidly crossing its field of view (FoV) simultaneously. This challenge significantly increases the size, complexity, and cost of the LEO ground station.

(3) Each satellite only covers a small region of the Earth, so a satellite hands over its services to the next one in the constellation when either the satellite or the user moves out of the operable service region. Frequent handover and insufficient coverage will lead to undesirable latency, poor signal quality and even service disruption.

One or more of the described passive metasurface implementations are structured surfaces designed to manipulate electromagnetic (EM) wavefronts by introducing a precise phase shift at each meta-atom. The passive metasurface design consists of two parts: macroscopic design and microscopic design. Generally, wavefront manipulation is achieved by controlling the phase of the EM signals at the subwavelength scale. Therefore, in the microscopic design, each subwavelength meta-atom is designed to span a desired range of angles (e.g., 0°~360° phase shift coverage) with high transmittance and support a desired phase shift. For example, a metasurface microscopic design selects a template for a meta-atom, which involves careful selection of substrate material, structure, and metallic geometric patterning (e.g., a ring, a circle, or a cross). Accordingly, at least one propagation element of each meta-atom is designed in terms of material, physical structure, and geometric pattern, and a single meta-atom may have multiple propagation elements, such as one for uplink and one for downlink although other variations may be employed.

In the macroscopic design, a phase shift profile (also referred to as a tuned propagation profile to reflect that the profile can reflect changes in phase and/or amplitude of an EM signal interacting with each metasurface) is encoded into the metasurface by placing each meta-atom (imposing the specifically-designed phase shift) at appropriate locations in the metasurface to provide a desired functionality. A macroscopic design determines the individual phase shift corresponding to each propagation element of each meta-atom distributed over the metasurface. The phase shift values applied to each meta-atom determines the explicit physical dimensions associated with the propagation element of each meta-atom.

A tuned (e.g., optimized) propagation profile can be implemented (e.g., based on joint design with the expected signal properties of the incoming EM signals and the expected positioning of EM signal receivers) by placing the meta-atoms at appropriate locations in the metasurface. Each meta-atom is designed to provide a deliberately designed phase shift coverage in aggregate (with the other meta-atoms) to achieve high transmittance/reflectivity. The described technology can provide specially designed uplink and/or downlink phase shift profiles to achieve dynamic fine-grained focusing and steering using a combination of a passive metasurface and a small phased array. As such, the physical dimensions and the distribution of the propagation elements of the meta-atoms in the passive metasurface are structurally tuned according to the tuned propagation profile to modulate the incoming electromagnetic wavefronts to generate a defined beam pattern of the electromagnetic signal exiting the passive metasurface corresponding to the input signal property set.

In summary, implementations of microscopic design searches for the metallic template (e.g., a propagation element having a circular pattern, a cross pattern, or another pattern) to achieve high transmittance, $2\pi$ phase control, and wide bandwidth. Implementations of macroscopic design searches for the phase shift at each meta-atom in aggregate across the metasurface, which is realized by determining the exact parameters for the distribution of the meta-atoms and their propagation elements. For example, in an example configuration, meta-atom 1 is designed for a phase change of $\pi/2$, which may be realized by a cross pattern with a specific length and width; meta-atom 2 is designed with a phase change of $\pi/3$, which may be realized by a cross pattern with a different length and width.

In some implementations, the passive metasurface of the communication system can support a single frequency band for communication. The communication system in one such implementation includes a passive metasurface formed of a metamaterial having a plurality of meta-atoms. Each meta-atom contains at least a portion of a propagation element that steers electromagnetic signals received from an electromagnetic signal transmitter within a supported frequency band toward an electromagnetic signal receiver. In this manner, varying the properties of incoming electromagnetic signals (e.g., phase, polarization, amplitude, incidence angle) impinging the passive metasurface can variably steer the exit angle of the electromagnetic signals toward the electromagnetic signal receiver, even as the relative position of the electromagnetic signal transmitter and/or the electromagnetic signal receiver with respect to the passive metasurface changes over time.

The input signal properties supported by the passive metasurface are defined by a plurality of input signal property sets, each set programmed as codewords of a phase array. Each input signal property set includes one or more input signal properties, wherein at least one of the property values differs from that property value in another set. For example, in one uplink implementation, the input signal property sets may include different signal phases. Accordingly, changing the phase of the input signal received by the passive metasurface across different sets causes the tuned propagation profile to steer an exit beam of the electromagnetic signal in different beam patterns (e.g., steering angles to track a moving satellite). For example, in one downlink implementation, the input signal property sets may include different angles of incidence of an incoming beam of electromagnetic signal (e.g., transmitted from a moving satellite). Accordingly, as the angle of incidence of the incoming beam of electromagnetic signal changes (e.g., as the satellite moves), the modulation of the tuned propagation profile steers an exit beam of the electromagnetic signal to focus on a gateway antenna, despite the changes in the incidence angle. Other signal properties, including without limitation amplitude and polarization, may be members of the input signal property sets. In one aspect, predefined input signal property sets represent discrete selections of one or more signal properties that vary over time, and the different predefined input signal property sets translate the input signal to an output signal exiting the passive metasurface at a corresponding predefined beam pattern (e.g., a steering angle to a relatively moving satellite, toward a relatively stationary gateway antenna or ground station).

Accordingly, electromagnetic signals received in compliance with an input signal property set of a plurality of different input signal property sets (e.g., having one or more different phases, polarizations, amplitudes, and/or incidence angles) at the specially designed passive metasurface can be steered to exit the passive metasurface at different predefined exit angles, so as to focus on an intended receiver. In LEO applications, for example, the communication system can steer electromagnetic signals received from a gateway antenna having a transmitting phased array toward a moving satellite in a defined frequency band or steer electromagnetic signals received from a moving satellite toward a gateway antenna having a receiving phased array in a defined frequency band. In an uplink scenario, the codebook of a phased array transmitter is jointly optimized with an uplink metasurface phase profile. Thus, electronic steering of electromagnetic signals toward a moving satellite can be realized by changing the codeword of the phased array to change the incidence angle of the signals impinging the passive metasurface. In downlink scenarios, the downlink metasurface phase is jointly optimized to improve focusing performance to a receiver over a wide range of incidence angles of signals received from the moving satellite.

In some other implementations, the passive metasurface of the communication system can support multiple frequency bands of communication (e.g., dual band communications for uplink communications to the moving satellites in one frequency band and downlink communications from the moving satellites in a second frequency band). For the uplink to the moving satellite, for example, outgoing signals transmitted from a phased array antenna (e.g., at a gateway antenna) are steered by a passive metasurface toward the moving satellite in the first frequency band. For the downlink from the moving satellite, incoming signals transmitted by the moving satellite are steered by the passive metasurface to a phased array at a target antenna (e.g., a gateway antenna) in the second frequency band. The passive metasurface is designed with meta-atoms that effectively combine the arriving electromagnetic signals from various incident angles and focus the electromagnetic signals toward a target antenna (e.g., a gateway antenna, a satellite antenna, or another electromagnetic signal receiver). In one example, the passive metasurface is a 21×21 metasurface PCB board working with one or more MIMO phased antenna arrays containing 4 receiving (RX) antennas and 4 transmitting (TX) antennas, although many other configurations are contemplated. In another implementation, a passive metasurface consists of 21×21 meta-atoms for uplink and 22×22 meta-atoms for downlink and is configured to communicate with 1×4 receiving phased array antennas and 1×4 transmitting phased array antennas.

The present disclosure advances the state of the art in at least one or more of the following ways:

An inexpensive passive metasurface design significantly improves the SNR (signal-to-noise ratio) of the communication link between electromagnetic signal transmitters and electromagnetic signal receivers (e.g., between LEO satellites and gateway antennas).

To eliminate the need for mechanical steering, a small phased array (e.g., in a gateway antenna) is leveraged and jointly designed with a passive metasurface providing MIMO beamforming to achieve dynamic steering to and/or from a current satellite position and maximize the received signal strength.

To avoid service disruption caused by hard handoff, a passive metasurface design, as described herein, electronically steers electromagnetic signals to communicate with multiple satellites simultaneously.

With respect to the technology described herein, metasurfaces are devices that can control the wavefronts of electromagnetic (EM) signal waves. In the scenario of LEO satellite communications, a metasurface is attractive for exploitation as an RSS enhancement device for the ground station transceiver because it is inexpensive, compact, and passive (e.g., no need for a power supply). The substantially 2D structure of an electromagnetic metasurface makes metasurface deployment easy. For example, a passive metasurface can be attached to a window in many communication scenarios where traditional wireless signals cannot reach.

Huygens metasurfaces (also known as HMSs, metasurfaces, smart surfaces, and intelligent surfaces), a type of artificial sub-wavelength structures with negligible thickness, have been extensively studied in physics and material communities. HMSs can be used in wireless communication systems, for example, 5G/6G technologies, including higher frequencies (e.g., millimeter-wave and Terahertz), to support higher data rates, but wireless links at higher frequencies experience more severe attenuation and blockage problems. A specially-designed Huygens metasurface (HMS) can provide both high transmission efficiency and full-phase coverage. HMS realizes powerful control over incident electromagnetic waves since it can respond to incident electric and magnetic fields by forming electric and magnetic dipoles. Schelkunoff's equivalence principle (a.k.a. the generalized form of Huygens' principle) explains how HMS can transform incident electromagnetic waves. A given incident electromagnetic wave ($\overrightarrow{E_1}$, $\overrightarrow{H_1}$) can be converted to a desired outgoing electromagnetic wave ($\overrightarrow{E_2}$, $\overrightarrow{H_2}$) by inducing orthogonal electric and magnetic currents ($\overrightarrow{J}$, $\overrightarrow{M}$) to the metasurface, where $\overrightarrow{J} = \hat{n} \times (\overrightarrow{H_2} - \overrightarrow{H_1})$ = and $\overrightarrow{M} = -\hat{n} \times (\overrightarrow{E_2} - \overrightarrow{E_1})$. Furthermore, the electric and magnetic currents are directly determined by the surface impedance ($Z_{se}$), surface admittance ($Y_{sm}$) and the average tangential incident fields ($\overrightarrow{E_t}$, $\overrightarrow{H_t}$). Therefore, the average tangential incident fields ($\overrightarrow{E_t}$, $\overrightarrow{H_t}$) can be expressed as follows:

$$\overrightarrow{E_t} = Z_{se} \cdot \left[ \hat{n} \times \left( \overrightarrow{H_2} - \overrightarrow{H_1} \right) \right] \tag{1}$$

$$\overrightarrow{H_t} = Y_{sm} \cdot \left[ -\hat{n} \times \left( \overrightarrow{E_2} - \overrightarrow{E_1} \right) \right]$$

Hence, once the incident electromagnetic fields and desired electromagnetic fields are defined, the surface impedance and admittance of the desired HMS can be calculated.

In some implementations, programmable metasurface controls electromagnetic signal waves in real time by introducing active elements (e.g., positive intrinsic-negative (PIN) diodes, varactor diodes, phase-changing materials, liquid crystals, and RF switches) into the surface. In contrast, a passive metasurface usually consists of many similar metasurface cells, unit cells, meta-cells, or meta-atoms (referred to herein as "meta-atoms") with pre-designed patterns. Different from a programmable metasurface, a passive metasurface generally realizes a fixed function of controlling wavefront and radiation patterns. Therefore, dynamic beam steering generally cannot be achieved by relying only on passive metasurfaces.

A passive metasurface utilized in LEO communication ground stations, as described herein, can fulfill one or more of the following requirements: dynamic steering across wide angles, dual-band support with a 360° phase shift ability, and high transmission efficiency. Such a passive metasurface can advance state-of-the-art metasurfaces in one or more of the following ways:

(i) A dual-band passive metasurface design supports both LEO uplink and downlink. An effective search algorithm is used to obtain each meta-atom's design with the close-to-optimal decoupling performance for two closely packed patterns.

(ii) The phased array technique is integrated into a passive metasurface to achieve multiple functionalities suited for LEO communication. By exploiting the inherent programmability of phased array antennas, waves arriving from different incident angles can be combined in the incoming (downlink) scenario, and the outgoing (uplink) waves can be steered to an arbitrary angle between a predefined angular range (e.g., −40° and +40°) in the uplink scenario.

FIG. 1 illustrates an example operational environment 100 for a passive metasurface (see passive metasurface 102 and passive metasurface 104). FIG. 1 illustrates a cut-away view of the interior of an airplane 106 (seats and other interior components have been removed). A gateway antenna 108 (acting as a moving ground station in FIG. 1) transmits and receives electromagnetic signals 110 to and from user equipment (e.g., a mobile phone 112, a tablet computer 114, and other communication devices). The gateway antenna 108 also transmits uplink signals to a LEO satellite 116 through the passive metasurface 102 and receives downlink signals from the LEO satellite 116 through the passive metasurface 104.

Each passive metasurface includes a plurality of meta-atoms. One or more subwavelength physical dimensions of each meta-atom of the meta-atom in the passive metasurface are tuned in combination with one or more phased arrays of a gateway antenna to support a range of incoming signal properties and corresponding exit angles. In addition, the passive metasurface design includes the tuned placement of the individually-designed meta-atoms throughout the passive metasurface to achieve a tuned propagation profile of the meta-atoms in aggregate over the passive metasurface. As such, a passive metasurface described herein can steer a beam at a different predefined exit angle based on changes to the incoming signal characteristic.

The passive metasurface 102 can significantly enhance the uplink RSS between a LEO satellite 116 and the gateway antenna 108 in an uplink operation. Accordingly, for the uplink to the LEO satellite 116, the passive metasurface 102 receives the electromagnetic signals 118 transmitted from the gateway antenna 108 at variable but deliberate signal and then steers the electromagnetic signals 118 towards a LEO satellite 116 that is moving in orbit relative to the passive metasurface 102, as regulated by the microscopic and macroscopic aspects of the passive metasurface design and the dynamically varying and controlled properties of the electromagnetic signals 118 received from the gateway antenna 108. For example, the phased array antennas in the gateway antenna 108 can alter the angle of the incident signal arriving at the passive metasurface 102. Then the meta-atoms across the passive metasurface 102 further change the phase offsets of the outgoing signals to collectively generate a specified beam pattern of the outgoing signal (e.g., beamforming or beam steering the signal towards the LEO satellite 116 as the LEO satellite 116 moves relative to the gateway antenna 108).

The passive metasurface 104 can significantly enhance the downlink RSS between the LEO satellite 116 and a gateway antenna 108 (acting as a moving ground station in FIG. 1) in a downlink operation. Accordingly, for the downlink from the LEO satellite 116, the passive metasurface 104 steers electromagnetic signals 122 from the LEO satellite 116 within its field of view (FoV) towards the gateway antenna 108. In this manner, the passive metasurface 104 steers the electromagnetic signals 122 received from a wide range of incident angles because LEO satellites are continuously moving across different angles with respect to the passive metasurface 104. This steering can, therefore, focus the electromagnetic signals 122 on the gateway antenna 108 from many different incidence angles from the satellite to provide an enhanced RSS. Upon reception, multiple antennas at the gateway antenna 108 can effectively combine the received signals to further increase the RSS. The gateway antenna 108 can then forward the received signals to an end-user device, such as the mobile phone 112 and the tablet computer 114.

To this end, a low-cost, compact, easy-to-deploy, smart LEO communication system with a passive metasurface described herein can provide one or more of the following unique advantages: (i) in the uplink, the passive metasurface can adaptively steer the outgoing signal towards the current location(s) of one or more moving satellites by controlling the properties of the electromagnetic signals received at the passive metasurface, and (ii) in the downlink, the passive metasurface supports RSS enhancement and beam focusing at a predefined angular range of incident angles (e.g., −40°~+40°) from one or more moving satellites. In other implementations, the described technology can support wireless communications in one or multiple directions in non-LEO applications.

While much of the description of FIG. 1 is directed to transmissive applications, it should be understood that the principles described herein can apply to reflective applications. Example reflective applications may include attempting to steer a received EM signal around an obstacle that obscures a line of sight between a transmitter and a receiver (e.g., in an urban environment).

Figure 2:
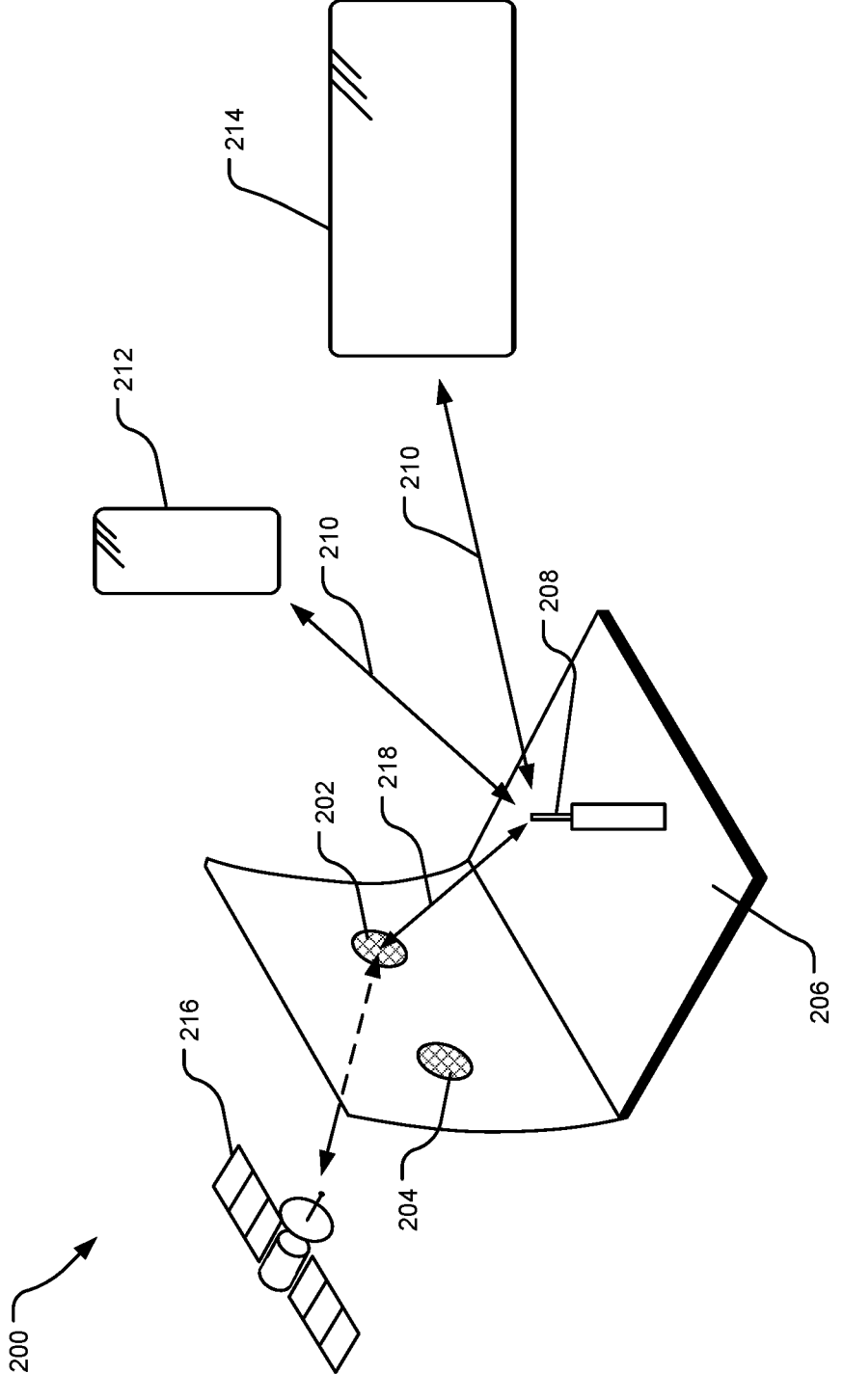
FIG. 2 illustrates an example operational environment for a passive metasurface supporting dual-band operation.

FIG. 2 illustrates an example operational environment 200 for a passive metasurface (see passive metasurface 202 and passive metasurface 204) supporting dual-band operation. FIG. 2 illustrates a cut-away view of the interior of an airplane 206 (seats and other interior components have been removed). A gateway antenna 208 (acting as a moving ground station in FIG. 2) transmits and receives electromagnetic signals 210 to and from user equipment (e.g., a mobile phone 212, a tablet computer 214, and other communication devices). The gateway antenna 208 also transmits uplink signals to a LEO satellite 216 through the passive metasurface 202 and receives downlink signals from the LEO satellite 216 through the passive metasurface 202. Likewise, the passive metasurface 204 may also have a similar dual-band operation in addition to or in place of the passive metasurface 202.

The passive metasurface 202 can significantly enhance the RSS between a LEO satellite 216 and the gateway antenna 208 in both uplink and downlink frequency bands. In such implementations, the passive metasurface 202 includes a first subset of propagation elements that have high transmissibility within a first (e.g., uplink) frequency band and a second subset of propagation elements that have high transmissibility within a second (e.g., downlink) frequency band. The transmissibility/reflectivity of individual meta-atoms of the passive metasurface 202 is dependent on the microscopic aspect of the meta-atom design, including one or more sub-wavelength physical dimensions of a propagation element. The placement and orientation of the two subsets of propagation elements of the meta-atoms are jointly designed with respect to the gateway antenna 208 (e.g., including a phased array) to minimize the mutual coupling between them, thereby minimizing interference.

Accordingly, for the uplink to a LEO satellite 216, the passive metasurface 202 can receive the electromagnetic signals 218 transmitted from the gateway antenna 208 in an uplink frequency band and then steer the electromagnetic signals 218 towards a LEO satellite 216 that is moving in orbit relative to the passive metasurface 202. For example, by adjusting the phase of the EM signals it transmits to the passive metasurface 202, the gateway antenna 208 is capable of modulating (or translating) the angle of incidence of the electromagnetic signals 218 received by the passive metasurface 202 (e.g., using a phased array) to an angle of exit directed at a corresponding predefined angle toward the moving LEO satellite 216. Accordingly, adjusting the phase at which the electromagnetic signals 218 arrive at the passive metasurface 202 changes the beam pattern of the electromagnetic signals 218 exiting the passive metasurface 202 toward the LEO satellite 216.

Likewise, the passive metasurface 202 can also significantly enhance the downlink RSS between the LEO satellite 216 and a gateway antenna 208 (acting as a moving ground station in FIG. 2) in a downlink operation. Accordingly, for the downlink from the LEO satellite 216 in a downlink frequency band, the passive metasurface 202 steers electromagnetic signals 218 received from the LEO satellite 216 within its field of view (FoV) towards the gateway antenna 208. In this manner, the passive metasurface 202 steers the electromagnetic signals 218 received from a wide range of incident angles because LEO satellites are continuously moving across different angles with respect to the passive metasurface 202. This steering can, therefore, focus the electromagnetic signals 218 received at different incidence angles on the gateway antenna 208 to provide an enhanced RSS. Upon reception, multiple antennas at the gateway antenna 208 can effectively combine their received signals to further increase the RSS. The gateway antenna 208 can then forward the received signals to an end-user device, such as the mobile phone 212 and the tablet computer 214.

In FIG. 2, a passive metasurface 204 may be used, in addition or as an alternative, for two-way communications between the gateway antenna 208 and the LEO satellite 216. For example, additive metasurfaces may be used to increase total throughput between the gateway antenna 208 (or another gateway antenna) and the LEO satellite 216 and/or alternative metasurfaces may be used to allow the selection of a higher throughput communication channel between gateway antenna and the LEO satellite 216. It should be understood that multiple satellites and/or multiple gateway antennas may be employed during communications, using one or more passive metasurfaces to steer the electromagnetic signals in one or both of uplink and downlink operations.

To this end, a low-cost, compact, easy-to-deploy, smart LEO communication system with a passive metasurface described herein can provide one or more of the following unique advantages: (i) in the uplink, the passive metasurface can adaptively steer the outgoing signal towards a satellite's current location(s) of one or more moving satellites by controlling the properties of the electromagnetic signals received at the passive metasurface, and (ii) in the downlink, the passive metasurface supports RSS enhancement and beam focusing at a predefined angular range of incident angles (e.g., $-40°\sim+40°$) from one or more moving satellites. In the implementation illustrated in FIG. 2, the passive metasurface supports dual-band, bidirectional communications. In other implementations, the described technology can support wireless communications in one or multiple directions in non-LEO applications.

While much of the description of FIG. 2 is directed to transmissive applications, it should be understood that the principles described herein can apply to reflective applications. Example reflective applications may include attempting to steer a received EM signal around an obstacle that obscures a line of sight between a transmitter and a receiver (e.g., in an urban environment).

Figure 3:
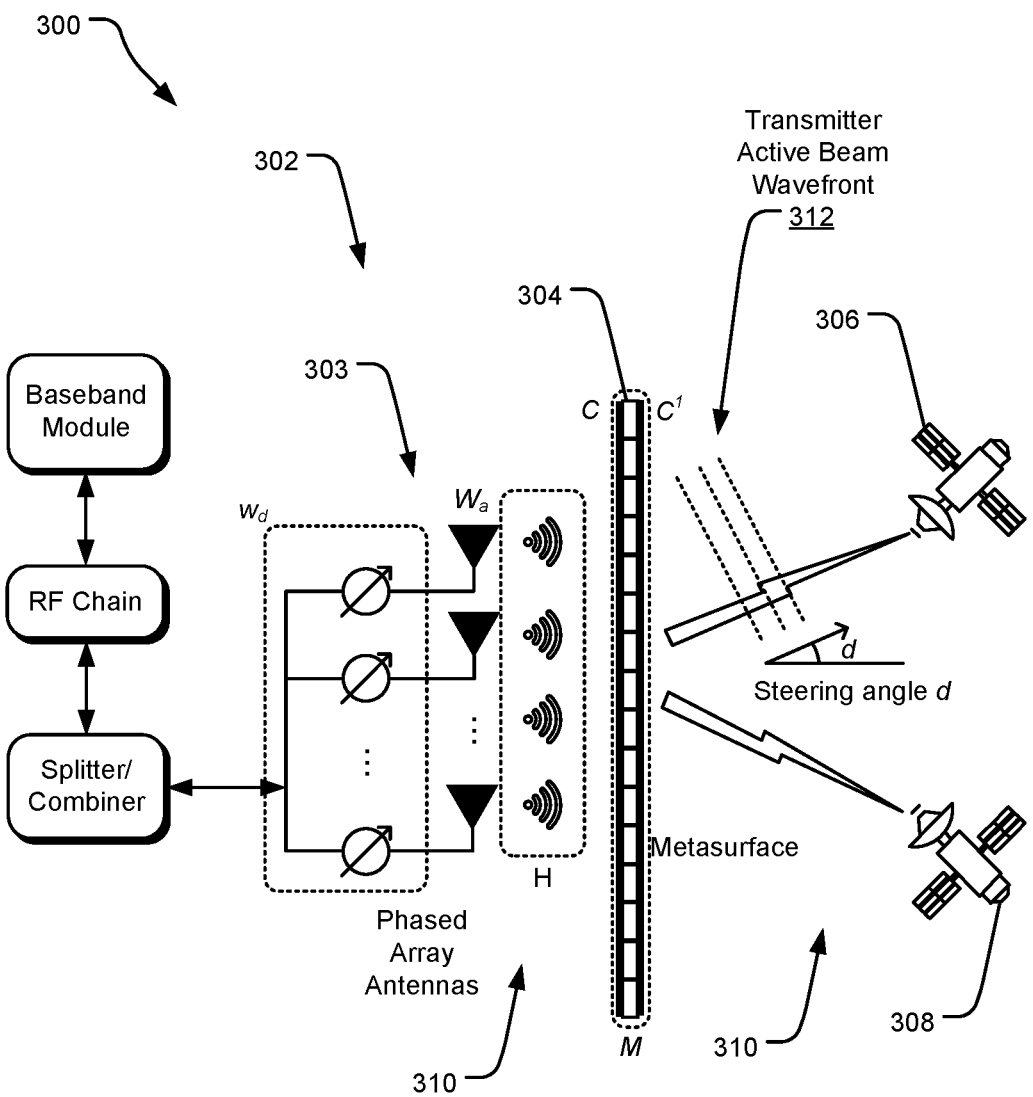
FIG. 3 illustrates an example communication system with a gateway antenna, a metasurface, a satellite, and a satellite.

FIG. 3 illustrates an example communication system 300 with a gateway antenna 302 (e.g., in a ground station), a metasurface 304, a satellite 306, and a satellite 308. In the illustrated implementation, the gateway antenna 302 includes one or more phased array antennas 303 (e.g., TX antennas for uplink and/or RX antennas for downlink). Below, uplink and downlink will initially be treated separately, although some implementations allow for dual-band and/or bidirectional operation. Other wireless communication technologies, such as cellular networks, also use different frequency bands for uplink and downlink and, therefore, can employ aspects of the described technology.

In the macroscopic aspect of the design for uplink, for a given steering angle d, electromagnetic signals 310 are radiated from a phased array antenna at the gateway antenna 302 with a codeword represented by $\vec{w}_d$, where each element is a complex number representing the properties of each antenna's feed signal. These electromagnetic signals 310 pass through the channel C between the phased array antennas and the metasurface 304. Different codewords result in the electromagnetic signals 310 impinging the metasurface 304 with different predefined signal properties.

A channel matrix H between the antenna array and the metasurface 304 is defined, where each element $H_{i,j}=A_{i,j}e^{\theta_{i,j}}$, $A_{i,j}$ is the decay term, and $\theta_{i,j}$ is the phase delay term. For $A_{i,j}$, a common free-space path loss for fading information is employed:

$$A_{i,j} = \frac{\lambda}{4\pi d_{i,j}}$$

where $d_{i,j}$ is the distance between the i-th antenna and the j-th meta-atom of the metasurface 304, and $\lambda$ is the wavelength at the center frequency of the frequency band of the electromagnetic signals 310. The phase delay term is calculated as:

$$\theta_{i,j} = \frac{2\pi d_{i,j}}{\lambda}$$

The metasurface 304 will modify the electromagnetic signals 310 through its own channel response:

$$M_j = A'_j e^{\theta'_j}$$

where $A_j'$ is the transmittance and $\theta_j'$ is the phase shift. The total channel matrix of the metasurface 304 is M, where $M_{jj}$ defines the channel response of the j-th meta-atom. An outgoing transmitter active beam wavefront 312 (represented by $MH\vec{w}_d$) should be perpendicular to the electromagnetic signals 310 direction of propagation represented by the steering angle d, such that the wave moves toward the receiver (e.g., the satellite 306). The tuned design of the electromagnetic signals 310 determines the physical configuration of the metasurface 304, as represented by the total channel matrix M of the metasurface 304 and the programmed codeword $\vec{w}_d$ of the phased array antennas to tune (e.g., maximize) the transmitted signal strength, $\vec{R}_d MH\vec{w}_d$, along the desired steering direction d, where $\vec{R}_d$ is the steering vector.

A communication system implementation having a specially-designed passive metasurface is intended to steer the beam of the electromagnetic signals 310 toward an electromagnetic signal receiver (e.g., satellite 306) in a range of angles. In one implementation, for example, k (equal to 81) desired steering directions are denoted as $\vec{d}=[-40°, -39°, \ldots, 40°]$.

Tuning the signal matrix, denoted as $$S = \sum\nolimits_{d=-40°}^{d=40°} \vec{R}_d MH\vec{w}_d,$$

applies to all the desired steering directions. Through matrix manipulation, T can be expressed in terms of constituent matrices as:

T=RMHW, where:

The matrix R is a k×L matrix (the steering matrix), where each row corresponds to a given direction d, and each column corresponds to the receive steering direction vector $R_d$.

The matrix M is an L×L matrix, where L is the number of meta-atoms in the metasurface 304.

The matrix H is of size L×N and represents the channel from the phased array (with N antennas) to the metasurface 304.

W is a N×k codebook, which includes a collection of codewords. For example, each codeword W specified a set of weights applied to the signals from phased array antennas, and W is a complex number that consists of amplitude and phase.

In the above matrix T, the steering matrix R is known in advance to the design process. The metasurface size, phases array size, and their relative positions and channel H are also known in advance. The joint design tunes the metasurface configuration M and the phased array antenna codebook W that maximize the power of outgoing EM signals from the metasurface 304 across a wide range of exit angles for a given R and H. Let P denote the power of the outgoing EM signal as $P=|S|^2$. Hence, the design problem can be formulated as follows:

$$\max_{M,W} tr(P) - var(diag(P)) - \|sum(P) - tr(P)\|_F$$

$$s.t. \begin{cases} |W_i| = 1, \ (i = 1, 2, \dots, N) \\ |M_{j,j}| = 1, \ (j = 1, 2, \dots, L) \end{cases}$$

where tr(P) denotes the trace of P, var(diag(P)) denotes the variance of the diagonal elements in P, and $\|sum(P)-tr(P)\|_F$ represents the Frobenius norm (i.e., the square root) of the sum of the absolute squares of all elements in P except the diagonal elements. The first term maximizes the power in the desired directions, the second term minimizes the variance of steering performance across different directions, and the third term minimizes the sidelobe. A search of M and W tunes or maximizes the objective over a plurality of input signal property sets. Due to cost constraints, commercial phased array antennas typically only utilize digital phase shifters to achieve phase delay, rather than including an amplifier for each individual antenna. Therefore, in at least one implementation, it is assumed that |wi|=1, which limits each antenna to only adjust phase delay, although other implementations may be employed. Further, in some implementations, the amplitude of each element on the diagonal of M should be equal to 1 because only the phase shift induced by the metasurface is considered.

A stochastic gradient descent algorithm may be used to solve this problem. To ensure the constraints are satisfied, the current values of M and W are normalized after each iteration of gradient descent. The learning rate is set to 0.05, and the exponential decay rates for the first and second moment estimates are set to 0.9 and 0.999, respectively.

Accordingly, for uplink, the metasurface 304 manipulates the electromagnetic signals 310 emitted from the gateway antenna 302 and steers the electromagnetic signals 310 in the directions of current satellite positions as the satellites move with respect to the metasurface 304. In various implementations, the metasurface 304 is passive and, therefore, does not dynamically change the phase distribution after the fabrication, although some implementations may involve some dynamic structures. Instead, a phased array of TX antennas in the gateway antenna 302 can generate different wavefronts on uplink by modulating the properties of the feeding signals of each TX antenna in the phased array. Accordingly, through deliberate design of the metasurface 304 and through deliberate corresponding EM signal property adjustment between the metasurface 304 and the gateway antenna 302 (in its transmitting operations), the functionality of the gateway antenna 302 can thus be integrated with the metasurface 304 to achieve electronically steered angles for LEO communication scenarios. In some implementations, the tuned phase distribution of the metasurface in the uplink may be determined by programming the antenna array in conjunction with a passive metasurface design in order to realize predefined corresponding electromagnetic beam patterns based on specific sets of EM signal properties transmitted from the gateway antenna 302.

This approach yields a communication system requiring fewer antennas than existing approaches and yielding a signal beam that is more directional. A passive metasurface can effectively improve the directivity on the azimuth plane. Moreover, benefiting from the 2D structure of the metasurface, the signal of the 1D linear array can also be focused in the elevation plane.

The discussion above focuses on supporting communication with a single moving satellite. In practice, it can be more beneficial for a gateway antenna to communicate with multiple satellites. In this way, when one satellite moves away or its signal comes across a blockage, the other satellites can help with the transmission seamlessly (e.g., by taking over the communications). One way to enable communication with multiple satellites at different positions is to use a phased antenna array with a large number of antennas to form multiple beams, where each beam is steered toward one satellite. However, a phased array design alone involves a large number of antennas to achieve a good beamforming performance. The metasurface 304 can be leveraged in a phased array antenna system to significantly reduce the number of antennas required to achieve similar multi-beam forming performance. Specifically, given a metasurface design, the beamforming weights at the phased array can be designed so that its outgoing waves are steered toward a given set of directions.

Support for multiple beam steering on uplink may be described as follows. Let the gateway antenna 302 communicate with R satellites within its field of view, where the directions of these satellites correspond to $$D=\{d_1,d_2, \dots, d_R\}.$$

The tuned metasurface M and corresponding codewords that allow selective steering of multiple beams separately can be determined as previously described for uplink. To support the steering of multiple beams, the codewords are weighted, summed, and normalized, which yields $$\vec{w} = \frac{1}{R}\sum_{d\in D}\vec{w}_d e^{j\theta_d}$$

The phase compensation term $e^{j\theta_d}$ introduces phase delays to each codeword $w_d$ to maximize or tune the power of the outgoing signals, while the 1/R term keeps the total transmission power from exceeding 1. Note that multiplying the phase compensation term $e^{j\theta_d}$ in each weight of the codeword has little or no impact on the beamforming direction. To determine the phase compensation term that supports multiple beams, the following optimization problem is formulated:

$$\max_{\alpha,\theta_a} w^H w,$$

where s.t.|w_i|≤1, for any i, and where H means the Hermitian transpose. The variable a is an index for the beamforming direction.

For the downlink, a focusing metasurface may be designed (i) to focus the incident plane waves received from the one or more LEO satellites to enhance RSS and (ii) to support the focus function for the incident signals from a wide range of different angles (e.g., as defined by a plurality of input signal property sets) since signals transmitted by various moving satellites will arrive at the gateway antenna 302 through the metasurface 304. In the downlink operation, phase shifters need not be used to beamform the receiving signals. Instead, the metasurface 304 focuses energy on receiving antennas at the gateway antenna 302 based on predetermined modulations in the metasurface 304 (whether transmissive or reflective). The meta-atoms of the metasurface 304 are structured and distributed such that incoming EM waveforms from different angles within a supported angular range are modulated in the metasurface 304 to focus on the receiving antennas for the gateway antenna 302.

Satellite transmission beam vector as $\overrightarrow{T_d}$ for a specific direction, d, that is also equivalent to the normalized wavefront vector of the plane wave that reaches the metasurface. The metasurface modulates the incident EM waves through a channel function, denoted as M. The antenna array receives the EM waves through the channel, denoted as H. Antennas in the array then combine all received signals and produce the final output signal, $WHM\overrightarrow{T_d}$, where W is a 1×N matrix representing the phased array antenna codebook and all elements are set to 1. In one implementation, the received signal strength from the antenna array in the incident direction is tuned or maximized. The receive signal in the downlink is modeled from all incident angles as a matrix: S=WHMT. The overall received signal power, $P=|S|^2$, is tuned or maximized in the downlink by searching W and M that tune or optimize the following objective:

$$\max_M sum(P) \text{ s.t.} |M_{j,j}| = 1, (j = 1, 2, \ldots, L)$$

where sum(S) represents the sum of power received by the antenna array. In some such modeling, it is assumed that the metasurface units have ideal transmittance (or reflectance) by fixing $|M_{j,j}|=1$.

Unlike in the uplink case, the downlink scenario does not have $|w_i|=1$ because the downlink receiver can combine the signals from different antennas using different scaling factors, which differ in both phases and magnitude, whereas the transmitter in the uplink scenario can change the phases of the outgoing signals from different antennas, but not the amplitudes since a power splitter in the uplink phased array antennas distributes equal power to each antenna.

The metasurface 304 can also support multi-satellite downlink communication. As satellites within the field of view transmit signals of varying frequencies towards the metasurface, the metasurface 304 can independently focus incoming signals of different frequencies and different angles of incidence and enhance the RSS of each satellite transmission. Subsequently, the ground station can effectively distinguish the enhanced signals in the frequency domain and successfully decode the transmitted data from each individual satellite. Hence, the described technology inherently supports the reception from multiple satellites simultaneously.

In another implementation, the downlink structure and functionality of the passive metasurface model may be described as follows. To modulate the incident waves from the moving satellite to beams focusing on the gateway antenna 302, the discrete phase distribution on the (phase gradient) metasurface 304 should satisfy the hyperbolic formation as given by Equation (3) owing to Fermet's principle, $$\phi_{x,y} = \frac{2\pi}{\lambda}\left(\sqrt{\left((xL)^2 + (yL)^2\right) + f^2} - f\right) \tag{3}$$

where $\phi_{x,y}$ is the phase difference of the meta-atom at the point (x, y) from the center of the metasurface, L is the length of each meta-atom, $\lambda$ is the free-space wavelength, and f is the focal length.

To support a wide incidence angle on downlink, a meta-atom structure is designed to be insensitive to the incidence angle, which means that the phase distribution of the metasurface 304 can remain constant for different angles of the incident wave as well. However, there is a slight difference in the incident wavefront. So, after satellite signals pass through the metasurface 304, the reshaped wavefront remains focused and only causes a shift in the focused region. Therefore, multiple receiver antennas may be applied as a gateway antenna system where the receiver antennas are placed in the range of focus area movement. Then, a maximum ratio combining (MRC) algorithm is leveraged, which is the optimal combiner, to maintain the high gain of RSS across different incident angles.

The meta-atom is primarily designed to support wide frequency bands. For this reason, when satellites in the FoV transmit signals at different frequencies to the metasurface, the metasurface 304 can still focus the electromagnetic waves at different frequencies and improve the RSS for each satellite transmission independently. The gateway antenna 302 station then distinguishes the RSS-enhanced signals in the frequency domain and decodes the transmitted data from each satellite. Therefore, the metasurface naturally supports multi-satellite signal reception in the downlink.

In some implementations, a metasurface meta-atom design simultaneously supports uplink communications (e.g., at 30 GHz) and downlink communications (e.g., 20 GHz) while achieving over 90% transmittance and 360° phase modulation capability. To achieve a compact Huygens Metasurface (HMS) design in at least one implementation, the pattern for 20 GHz is arranged in the center of the meta-atom, and the pattern for 30 GHz is arranged about the perimeter of the meta-atom. An effective search algorithm is used to obtain a close-to-optimal arrangement between the downlink and uplink patterns so the meta-atom can realize dual-frequency decoupling for better dual-band performance. The design algorithm also finds the geometric parameters of each pattern to satisfy the requirements of wide-angle support, high transmittance, and 360° phase shift coverage in two widely separated frequency bands.

Next, to support dynamic functionalities in downlink and uplink, the system integrates the metasurface into a multiple input, multiple output (MIMO) antenna array. MIMO is an antenna technology for wireless communications in which multiple antennas are used at both the source (transmitter) and the destination (receiver). MIMO communication sends the same data as several signals simultaneously through multiple antennas while still utilizing a single radio channel. This antenna diversity improves the signal quality and the strength of an electromagnetic signal. The metasurface can dynamically adapt to these different outgoing and incoming electromagnetic signals toward an electromagnetic signal receiver. The communication system leverages the antenna array and the passive metasurface together to achieve electronic beam steering.

The uplink design involves dynamic steering of the outgoing signal. Existing passive metasurfaces are static and cannot adapt the outgoing signal transmitted to different angles on the fly. Hence, the multiple-antenna array at the gateway antenna is leveraged to dynamically change the incident angle towards the metasurface, which equivalently changes the corresponding outgoing signal to the desired direction.

A MIMO beamforming and the metasurface phase compensation matrix can be approached as an optimization problem, and an efficient algorithm based on gradient descent is provided. The algorithm is flexible and can support electronic beam steering towards one or multiple satellites. The ability to communicate with multiple satellites is appealing as it can eliminate service disruption during the hard handover (e.g., breaking the connection with the previous satellite before making a connection with the new satellite).

On the downlink side, a cell design that accommodates wide incident angles is desirable. Note that different incident angles correspond to the wave transmitted from different LEO satellites. The unit-cell design covers from −40° to +40°. Multiple antennas at the ground station are still leveraged to gather the received signals using a Maximal Ratio Combining (MRC) algorithm.

The communication system was evaluated using MATLAB simulation, high-fidelity HFSS simulation, and testbed experiments. A PCB board for the metasurface was generated consisting of 21×21 meta-atoms and a PCB board containing 20 GHz and 30 GHz patch antenna arrays. The results show that combining a metasurface pursuant to the design constructs disclosed herein with the phased array yields significant signal gain for both uplink and downlink. Specifically, a system prototype achieves 8.7 and 23.1 dB gains in the downlink and uplink, respectively.

The communication system design can be summarized as follows:

A metasurface-added antenna array system is used to support both uplink and downlink communication on the Ka-band. Particularly, a single metasurface is used to support dual bands and achieve high signal strength in both communication directions with minimal mutual interference.

A combination of an antenna array with a passive metasurface achieves dynamic adaptation. For the uplink, an algorithm for the design of the metasurface promotes beamforming through the metasurface, which converts the electromagnetic waves generated by multiple patch antennas into waves transmitted to various directions. The adaptation through multiple-antenna beamforming allows the signals coming out of the metasurface to dynamically adapt towards the desired transmission direction. To remove the performance penalty incurred by hard handover, the communication system enables electronic steering of directions to communicate with multiple satellites simultaneously.

For the downlink, the described passive metasurface supports a wide range of incident angles. The design leverages a multiple-antenna array as a gateway antenna system, together with metasurface, to adaptively combine the signals arriving from different directions. Some implementations also support the signal reception from multiple satellites simultaneously.

Experimental results of a system prototype support actual functional results per the design. Specifically, the prototype achieves 8.7 and 23.1 dB gains in the downlink and uplink, respectively.

An HMS enables shaping the wavefront of incident electromagnetic waves with high precision, and its design typically includes two parts: macroscopic and microscopic design. First, wavefront manipulation is achieved by controlling the phase of the electromagnetic signals at the subwavelength scale. Therefore, in the macroscopic design, the tuned propagation profile is determined and further encoded into the metasurface to provide a desired functionality. Next, each subwavelength meta-atom should be designed to span the entire 0° to 360 phase shift coverage with high transmittance. In the microscopic design, a meta-atom is designed in terms of material, physical structure, and geometry pattern. The desired microscopic structure can support full $2\pi$ phase coverage while maintaining a high transmission efficiency in both downlink and uplink frequency bands.

In the LEO satellite communication scenario, a microscopic meta-atom design needs to support dual-band, wide-angle, and wide-phase shifts. It is desirable to use a single metasurface to support both uplink and downlink communication. This means that each meta-atom should have the capability to control $0\sim2\pi$ phase shift independently in both uplink and downlink frequency bands and remain in high transmittance. This is challenging due to the possible interference induced by the coupling between the uplink and downlink geometry patterns. As the satellite is constantly moving, the incident angle of the satellite signals to the metasurface changes accordingly. Therefore, it is important for the designed meta-atoms to support wide incident angles. In other words, it means that incident waves with different angles should not affect the phase shift ability and transmittance of each meta-atom. Since the LEO satellite systems usually use wide bands for both uplink and downlink to increase the link capacity, the meta-atom should have similar phase shifting and transmission capabilities across the entire uplink and downlink bands.

Figure 4:
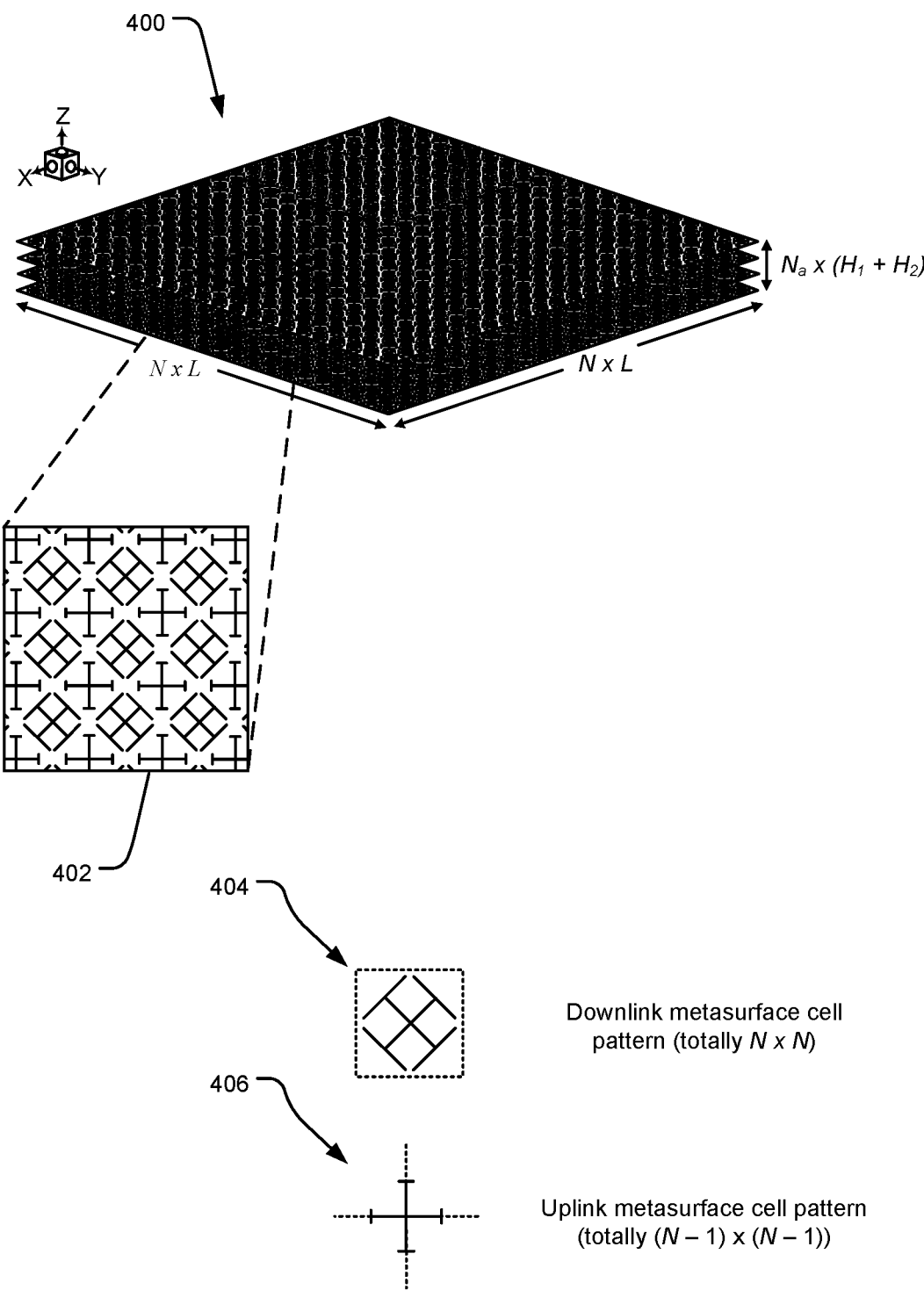
FIG. 4 illustrates properties of an example passive metasurface.

FIG. 4 illustrates properties of an example passive metasurface 400. The passive metasurface 400 is illustrated as a dual-band, bidirectional metasurface including hundreds of meta-atoms, although other implementations may provide a single-band, unidirectional metasurface. To achieve dual-band signal modulation on a single metasurface, meta-atom geometries for the downlink and uplink are designed separately and packed closely in the meta-atom. A single-band, unidirectional metasurface may include only a single meta-atom geometry, although other configurations may be employed. An expanded view of a portion of the passive metasurface 400 is shown as portion 402. The passive metasurface 400 is depicted in FIG. 4 as a multi-layer structure, where the thicker black structures (e.g., the various crosses) represent apertures in a metal layer (copper-clad area) arranged on a dielectric substrate. Furthermore, the passive metasurface 400 includes four metasurface layers stacked in substantial parallel, although a greater or lesser number of metasurface layers may be employed.

For the downlink pattern, a Jerusalem cross-shaped element (meta-atom element 404) is designated for operation at 20 GHz based on its physical dimensions, which are deliberately designed for a given frequency band and a given incidence angle vs. exit angle relationship. The meta-atom element 404 is positioned within a meta-atom designated by the dotted lines, although the meta-atom boundaries may be shifted relative to the meta-atom element 404 in other implementations. The cross-slot structures of this element pattern can provide relatively complete phase control while maintaining low-loss transmission. Note that phase regulating parameters of the downlink band are feature dimensions $L_1$ and $L_D$ (See FIG. 5). These feature dimensions are tuned together and bonded by LD=$L_1$/scale, where scale is a constant related to the decoupling performance, meaning that different phase responses of the meta-atom can be obtained when different $L_1$ parameters are applied.

For the uplink pattern, another Jerusalem cross-shaped element (meta-atom element 406) is divided along the corners of multiple meta-atoms and is designated for operation at 30 GHz. In one implementation, the structures of the meta-atom portions are positioned in the corners of multiple meta-atoms (designated by the dotted lines) such that the portions combine among the adjacent meta-atoms to form the single meta-atom element 406. The meta-atom boundaries may be shifted relative to the meta-atom element 406 in other implementations. Note that the metasurface is composed of periodically arranged meta-atoms, so these four corners in each meta-atom remain as a kind of cross-slot structure. A phase regulating parameter of the uplink band is the feature dimension $L_2$ (see FIG. 5), where $L_U$ is a constant related to the decoupling performance.

Figure 5:
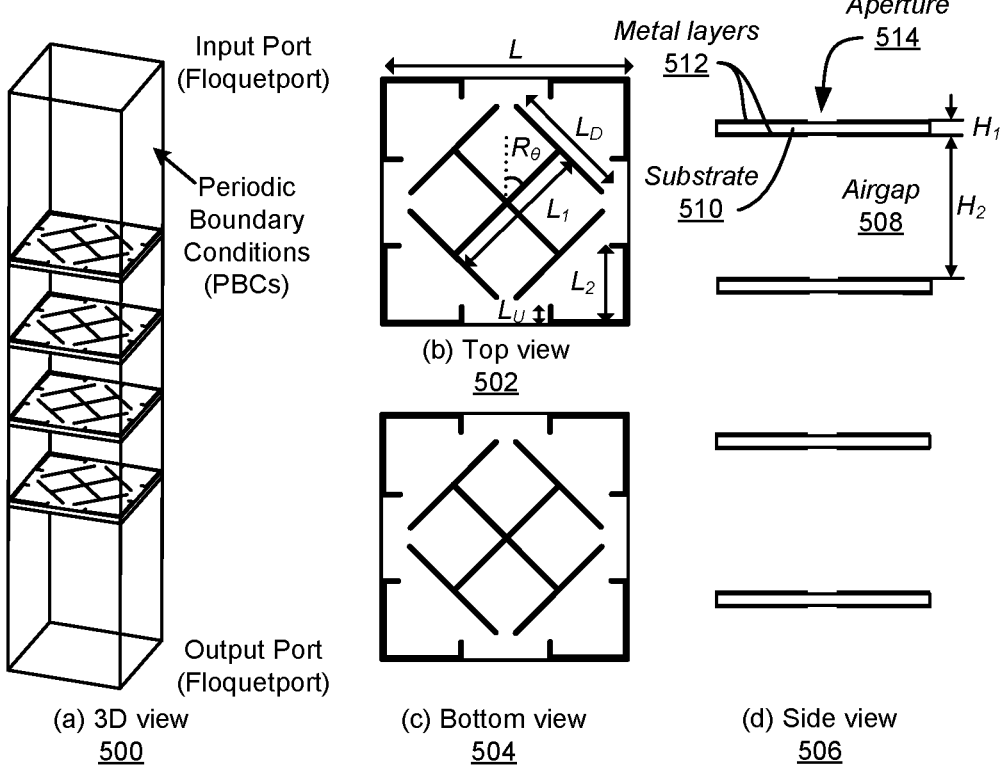
FIG. 5 illustrates a three-dimensional view of an example multiple-layer metasurface structure designed to increase transmittance and phase shift coverage for both the downlink and uplink.

Coupling occurs between two closely packed meta-atom patterns. For example, the slot of length $L_D$ and the slot of length $L_2$ form a new capacitance, which changes the surface impedance and admittance of the meta-atom. In turn, the changes in the surface properties will change the stipulated phase performance of both the downlink pattern and the uplink pattern. For the purpose of mitigating the coupling interference, another decoupling parameter, $R_\theta$, is added to change the relative position of the downlink pattern and uplink pattern. As such, imposing different angular orientations (e.g., about 45°) on the uplink and downlink meta-atom elements reduces the electromagnetic coupling interference of the uplink and downlink meta-atom elements, FIG. 5 illustrates a three-dimensional view 500 of an example multiple-layer metasurface structure designed to increase transmittance and phase shift coverage for both the downlink and uplink. The metasurface layers are separated by air gaps with height $H_2$, and every layer shares a similar geometry design, subject to the incidence angle vs. exit angle relationships across the multiple layers.

A top plan view 502 of the example multiple-layer metasurface structure provides labels, for example, physical dimensions of propagation elements in relation to an example meta-atom (depicted in FIG. 5 as a square or rectangle). A bottom plan view 504 of the example multiple-layer metasurface structure is also shown. It should be noted that two other intermediate layers of multiple-layer metasurface structure are obscured by the top plan view 502 and the bottom plan view 504. A side view 506 of the multiple-layer metasurface structure shows the top metasurface layer, the bottom metasurface layer, and the two intermediate metasurface layers with substrate thickness $H_1$ and airgap spacing $H_2$ (airgap 508). Each metasurface layer includes a dielectric substrate 510 onto which metal layers are applied, with an aperture 514 being formed in the metal layers 512. The physical dimensions shown in top plan view 502 describe the physical dimensions of the corresponding aperture forming the propagation element represented by the Jerusalem cross structures. The substrate thicknesses of the other metasurface layers and the spacings between them are generally the same substrate thickness $H_1$ and airgap spacing $H_2$, although these dimensions may be varied in other implementations.

To obtain the frequency response of a designed meta-atom, transmittance parameter S21 is observed, where |S21| represents the amplitude response and $\angle$S21 represents the phase response. A meta-atom model has been built in the Ansys HFSS 3D electromagnetic field simulator. The meta-atom model contains input and output Floquet ports along its broadside direction. The remaining four surrounding walls of the air box are assigned with periodic boundary conditions (PBCs). An example of a frequency response of transmission amplitude of an example design of a meta-atom for different values of downlink and uplink phase regulating parameters (e.g., $L_1$ and $L_2$) when other structure parameters remain default: L=5.3 mm, $L_D$=2, $L_U$=0.1 mm, $R_\theta$=0, $H_2$=2.5 mm, # of layers=2. The results verify that the design of the meta-atom, in which the two uplink and downlink patterns are packed closely, can support both frequency bands simultaneously with negligible energy loss.

In one implementation, among all the parameters in the meta-atom design, $L_1$ and $L_2$ are the phase-regulating variables that are used to tune the phase shift of the incident waves in the downlink and uplink, respectively. The range of values of the $L_1$ variable is from 3.0 mm to 4.0 mm, and $L_2$ takes values from 1.4 mm to 1.8 mm. The remaining parameters, which are referred to as "structure parameters," are constants once they are optimized or tuned for a passive metasurface. Next, tuned structure parameters of the meta-atom that would enable it to satisfy the three key requirements in both the uplink and downlink, namely, 360° of phase shift coverage, wide incident angles (e.g., −40° to +40°), and wide bandwidth (e.g., 1.5 GHz), need to be determined.

Various structure parameters, including the candidate values of each structure parameter, are summarized below:

Airgap layers (M): [0, 1, 2, . . . , 5], number of choices: 6;

Airgap height ($H_2$): 0.3 mm~4.5 mm, step size: 0.3 mm, number of steps: 15;

Unit pattern length (L): 5.0 mm~6.0 mm, step size: 0.1 mm, number of steps: 11;

Downlink pattern parameter:

$$L_D := \frac{L_1}{k},$$

scale k: 1.3~4, step: 0.1, number of steps: 28;

Uplink pattern parameter: $L_U$: 0 mm~0.3 mm, step: 0.01 mm, number of steps: 31; and Rotation angle of downlink pattern: $R_\theta$: 0°~45°, step: 5°, number of steps: 10.

There are 6×15×11×28×31×10=277,200 candidate structures in total, which is a huge search space. The following objective function can be defined:

$$\underset{\exists P}{\mathrm{argmax}}\left(\sum\nolimits_{\theta_i}\sum\nolimits_{f_{down}}\sum\nolimits_{L_2}F_d(L_1)+\sum\nolimits_{\theta_i}\sum\nolimits_{f_{up}}\sum\nolimits_{L_1}F_u(L_2)\right), \text{where}$$

$$F_d(L_1)=\tanh\left(\max\left(\angle S21\left(\hat{L}_1\right)\right)-\min\left(\angle S21\left(\hat{L}_1\right)\right)-360\right),$$

$$\hat{L}_1=\omega:\left|S21\right|_{dB}(L_1)>-3,$$

$$F_u(L_2)=\tanh\left(\max\left(\angle S21\left(\hat{L}_2\right)\right)-\min\left(\angle S21\left(\hat{L}_2\right)\right)-360\right), \text{and}$$

$$\hat{L}_2=\omega:\left|S21\right|_{dB}(L_2)>-3,$$

where max( ) and min( ) are the functions to return the maximum and minimum values, and tanh( ) is the hyperbolic tangent function. $\theta_i$ represents the angles of incident angles towards the meta-atom and ranges from −40 to 40, $f_{down}$ represents the band of downlink and ranges from 19 GHz to 20 GHz, $f_{up}$ represents the band of uplink and ranges from 29 GHz to 30 GHz. Note that the S21 of a meta-atom given the $\vec{S}P$, $L_1$, and $L_2$ is calculated by HFSS. tan h( ) is maximized when the phase has 360° coverage. $F_d(L_1)$. Similarly, $F_u(L_2)$ is summed across all angles, all frequencies, and all values of $L_2$ to achieve wide angle, wide band, and decoupling from the downlink. The search is designed to return a good set of structure parameters $\vec{S}P=\{M, H_2, L, k, L_U, R_\theta\}$ to maximize the objective.

This problem is a combinatorial optimization problem with feasible discrete solutions. Due to the huge search space, exhaustive search is not tractable. Therefore, a genetic algorithm is adopted as an effective search algorithm to obtain a good structure parameter set: airgap layers $(N_a)$=4, airgap height $(H_2)$=3.6 mm, unit pattern length (L)=5.3 mm, downlink pattern parameter (k)=1.5, uplink pattern parameter $(L_U)$=0.25 mm, rotation angle of downlink pattern $(R_\theta)$=45 deg. Other implementations may include without limitation Bayesian optimization or simulated annealing.

Varying $L_1$ from 3.32 mm to 3.81 mm can obtain 360° phase shift coverage with high transmittance at 20 GHz. The ability to phase shift is almost independent of $L_2$, which indicates that the decoupling works well. Another example design of the meta-atom is insensitive to the wide incident angles from −40° to 40° in the downlink. Even though the incident angle varies, the meta-atom still achieves almost the same phase shift coverage at high transmittance. Note that the phase offset vs. $L_2$ change across different frequencies, but the curves of these parameters still share a similar slope. To control a wavefront through a metasurface, only the phase difference across different meta-atom elements matters and adding a constant phase to all meta-atoms does not affect the outgoing electromagnetic wavefront.

As for uplink, the example meta-atom is feasible to support various incident angles and wide bands with 360° phase shift convergence and high transmittance. In one example, $L_1$ from 3.4 mm to 3.81 mm was used to realize 360° of phase modulation for downlink (20 Ghz), and $L_2$ from 1.55 mm to 1.73 mm was used to realize 360° of phase modulation for uplink (30 Ghz).

After finishing the microscopic design, a macroscopic phase profile design may be used to determine the phase offset values in both the uplink and downlink of each meta-atom. After obtaining macroscopic design schemes, the desired phase offset of each meta-atom can be mapped to $L_1$ and $L_2$. The metasurface constituted by the periodic array of meta-atoms can be obtained with the desired function of controlling wavefront and radiation patterns. In the example design, a single metasurface includes N×N elements for the downlink wavefront manipulation and (N−1)×(N−1) elements for the uplink wavefront manipulation.

A passive metasurface prototype was manufactured to validate this example design implementation. The prototype consists of two main parts: a dual-band metasurface and the MIMO antenna array. A 3D printed mounting bracket is fabricated to ensure the metasurface and MIMO antenna array are 2 cm apart, which is the focal length of the designed metasurface, and the center of the metasurface is well aligned with the center of the uplink antenna array.

The metasurface PCBs are fabricated using standard photolithographic techniques on 0.254 mm F4BM220 with a permittivity of $\epsilon_r$=2.2 and a loss tangent of tan δ=0.001. The uplink part of the metasurface consists of 21×21 meta elements, while the downlink part consists of 22×22 meta elements. This prototype embodiment uses only one parameter of each meta-atom design for the phase shift (e.g., $L_1$ for the downlink and $L_2$ for the uplink). In order to achieve the desired beam focusing, the detailed phase-shift parameters of meta-atoms are determined by the calculated phase-shift distributions. The resulting metasurface has four layers with airgaps in between. 3.6 mm thick Acrylic strips are glued on the black margins of each layer (electromagnetic-irrelevant components). The purpose of Acrylic strips is two-fold: i) to assemble four layers of PCB together, and ii) to ensure the air gap between each layer has the desired width (e.g., 3.6 mm). The full four-layer metasurface measures 12.66 cm×12.66 cm×1.17 cm. The manufacturing cost of the prototype metasurface and MIMO patch antennas is already reasonable and can be further reduced significantly during mass production.

Two microstrip patch antenna arrays are designed to support the uplink and downlink. Two sets of patch antenna arrays are fabricated on the 0.381 mm F4BM220. For the uplink transmission antenna system, a 1×4 line array is designed at intervals of 2 cm (e.g., 2 wavelengths). Similarly, each transmission antenna consists of 2×2 square patch sub-antennas. The designed transmission antenna can work at 28~31 GHz, with a return loss of −4 dB within 16% bandwidth and a measured gain of 6 dBi.

For the downlink, a 1×4 line array antenna is designed with 3 cm (⅕ wavelength) spacing between antennas. The receiver antenna consists of a 2×2 square patch sub-antennas with the same feeding port. Each receiver antenna works at 18~21 GHz with a return loss of −4 dB within 16% bandwidth and a measured gain of 6 dBi.

Matlab is used for antenna theory simulation, Ansys HFSS for numerical simulation, and testbed experiments to perform a real-world evaluation. These three methods are complementary to each other. Matlab simulation allows efficient evaluation of the communication system under diverse settings from a high-level perspective. HFSS implements a mathematical model for an electromagnetic propagation system to perform high-resolution simulation of the metasurface. Different from Matlab simulation, which takes the phase offset introduced by each meta-atom in the metasurface as the input to derive the received signal, HFSS performs a detailed simulation of how electromagnetic wave propagates through each layer in the metasurface and air gap to derive the phase offset. HFSS helps validate the high-level matlab simulation. Testbed experiments further evaluate the fabricated metasurface and MIMO algorithm in the real world.

Field tests were conducted on the fabricated passive metasurface prototype described above. The entire field test was performed in a microwave anechoic chamber to minimize multipath effects and simulate the direct path between the LEO satellite and gateway antenna.

During the uplink test, the aforementioned four-channel signal generator was connected to the designed uplink transmitter antenna array. Each channel of the generator provides a feeding signal to each transmitter antenna independently. Moreover, the feeding signal can be controlled via built-in phase modulation and amplitude modulation modules of the signal generator. Specifically, the phase modulation module can cover 0°~360° with 0.1 resolution while the amplitude modulation can achieve 0.01 dBm resolution.

To measure RSS and the beam pattern from the prototype communication system uplink module (e.g., a transmitter antenna array plus a metasurface), an off-the-shelf BJ320 (WR-28) linear polarization horn antenna was used as the receiver indicated as horn antenna 3. Since the operating band of horn antenna 3 ranges from 26.5 GHz to 40 GHz, it can simulate a LEO satellite receiver antenna very well. Horn antenna 3 is installed on a robotic arm, which can be controlled to perform a −90°~90° rotation on an elevation-cut plane (when azimuth angle=0°) to simulate a moving LEO satellite receiver.

Two off-the-shelf BJ220 (WR-42) linear polarization horn antennas (designated as horn antennas 1 and 2) were used for the downlink transmitter, with working frequencies between 17.6~26.7 GHz to simulate transmitter antennas for two LEO satellites. An AnaPico APMS40G-ULN, a phase-coherent four-channel signal generator with frequencies up to 40 GHz, is connected to the two transmitter horn antennas. Each channel works as an independent feeding signal source. A Rohde & Schwarz FSW50 signal analyzer 50 GHz is connected with the fabricated downlink receiver antenna array to measure the received signal strength (RSS in dBm) of the wave received by the communication system downlink module prototype. In the downlink testbed, horn antennas 1 and 2 are mounted on two separate tripods. By changing the relative position between the horn antennas and the communication system prototype, the satellite to a gateway antenna at different incident angles can be simulated.

The relative performances of the prototype 4-antenna transmitter phased array with and without the metasurface differ when the transmitter component steers waves to different angles, which vary from 0° to 40°. The measured beam patterns of the passive metasurface prototype match well with Matlab simulation results. Moreover, the transmission array with the metasurface consistently outperforms the transmitter array without the metasurface. The beam width becomes smaller when the metasurface is applied, which is evident from both the Matlab simulation and the real-world measurement. The measured beam pattern has also increased gain in the desired angle. The improvement ranges between 6.60~ 8.68 dBi after adding the metasurface when compared to the phased array alone. These results demonstrate the effectiveness of integrating metasurface into the transmitter array.

Measured gains across different outgoing angles vary as the frequency differs. For example, the gain ranges from 9.21 dBi to 11.59 dBi between −40° and 40° at 30 GHz. The gains at 29 GHz-29.9 GHz are similar to the gains at the designed 30 GHz. These numbers show that the prototype metasurface can achieve a relatively wide radiation angle range, which is sufficient for LEO satellite communication. Current satellite antennas can usually achieve −30~30 3 dB beam range; thus, the communication system uplink transmitter component outperforms regular satellite antennas. However, further deviations from the designed operation frequency (e.g., at 28.7 GHz and 28.5 GHz) reduce the gain noticeably. At 28.7 GHz, the gains decrease to 6.27-9.17 dBi, and at 28.5 GHz, the gains decrease to 4.66-6.75 dBi. Therefore, the prototype design can support 2 GHz bandwidth (1 GHz difference from the center frequency at each end), which is sufficient for LEO uplink communication.

The steering performance of the 1D phased array size and metasurface size are varied. Notably, (i) increasing the phased array size increases the gain, (ii) increasing the metasurface size also increases the gain, (iii) a 1×4 phased array with 21×21 metasurface outperforms a 1×21 phased array alone due to the 2D metasurface structure. To further improve performance, one could further combine a 2D phased array with a 2D metasurface.

The performance when the transmitter component simultaneously steers the outgoing beam toward two satellites at −30° and 20°, toward three satellites at the same time: −20°, 10° and 30°, or toward other numbers of satellites. As indicated, even only with 4 antennas, the prototype passive metasurface-transmitter combination can nicely steer the outgoing waves to multiple desired angles simultaneously. While there are some side lobes inevitably appearing at other undesirable angles, the RSS of the side lobes is −8 dB lower than the main lobes, which is acceptable for LEO communications.

The field intensity gain for the downlink system when the incident angle varies from −40° to 40°. Experimental results align well with MATLAB simulation results. Also, w/ HMS, 4 Rx≈w/ HMS 1 Rx (moving)>w/ HFS, 1 Rx (fixed)>w/o HFS, 4 Rx (fixed)+MRC>w/o HFS, 1 Rx (fixed), which is consistent with the expectation. By exploiting the beamforming ability of the receiver array together with the example metasurface, a stationary receiver component can adapt well to the satellite movement, just as the ideal mechanical movement of a receiver antenna. Only one stationary receiver antenna cooperating with the metasurface allows receiver beamforming to come from a fixed direction but cannot adapt to signals from other directions as required in LEO communication. On the other hand, without the metasurface, a receiver array alone has limited gain due to the limited number of antennas (e.g., 4 in the examples presented herein). Naturally, the field intensity received from one individual antenna wo/HFS is the lowest, as would be expected. Therefore, the results demonstrate the significant benefits of combining metasurface with a phased array.

The field intensity gain for the downlink varies across different angles when the frequency changes. A prototype passive metasurface can achieve excellent beam focusing when the incident angle varies in the range of −40°~40°. When the frequency spans between 19 GHz~20 GHz, the field intensity gain remains high, around 20 dB from −40 to 40 degrees. However, the average field intensity gain reduces to 14.3 dB at 18.7 GHz and to 12.3 dB at 18.5 GHz. A 1 GHz bandwidth can satisfy the downlink requirements. Similarly, the relatively narrow bandwidth of the metasurface can prevent the system from amplifying the noise close to the operating frequency at the same time.

The beam focusing performance can vary with different metasurface sizes. All curves are from Matlab simulation except the '8×8 HFSS' and '22×22 real-world', which are the results derived from HESS simulation and filed test results obtained from the prototype system, respectively. The small difference between the 8×8 HFSS curve and the 8×8 Matlab curve validates the accuracy of the Matlab simulation. Moreover, similar performance is observed between 22×22 real-world and 22×22 Matlab, which further validates the accuracy of the Matlab simulation. Furthermore, the larger the metasurface, the higher the gain. Specifically, 32×32, 26×26, 22×22, 16×16, 12×12, and 8×8 achieve 25.33 dB, 24.17 dB, 23.03 dB, 21.13 dB, 19.16 dB, and 16.02 dB, respectively. In addition, the gain remains nearly unchanged when the incident angle shifts from −40° to 40° For all metasurface sizes except the two largest sizes: 32×32 and 26×26, which experience slight drops. This is because the metasurface with a larger size is more sensitive to the incident angle. Tracing the root cause, a larger incident angle will lead to more obvious electromagnetic decoupling between the center meta element and other meta elements.

Furthermore, the electromagnetic decoupling effect between two elements is proportional if their distance is larger, which explains the slight drops at some incident angles when the metasurface size increases. Nevertheless, the beam-focusing effect is still preserved even in the presence of slight drops.

Two horn antennas are used to simulate two satellites transmitting signals at the same time, where each horn antenna generates electromagnetic waves at a different frequency. Patch antennas are used to receive the signals after passing through the metasurface. The signals from different transmitters on different frequencies can independently pass through the metasurface and reach the receiver for processing without interference.

The passive metasurface prototype includes a metasurface PCB board, a microstrip patch antenna array with 4 RX antennas and 4 TX antennas, and a signal generator. In comparison, a phased-array-only approach requires 14×14 antennas in order to achieve comparable steering performance (e.g., beamwidth and gain) to the passive metasurface prototype system. The phased array-only system will also include 196 antennas and feeding source devices (e.g., 13.72×communication system cost). This estimate is conservative. In practice, there are more cable costs and computational resources costs incurred in a phased array-only scheme. Therefore, the system disclosed herein is an attractive alternative for a ground station in the LEO satellite communications.

FIG. 6 illustrates example operations 600 for designing a passive metasurface for interacting with an electromagnetic signal received at the passive metasurface from an electromagnetic signal transmitter. A search operation 602 executes a search to tune physical dimensions and distribution of meta-atoms distributed in the passive metasurface with respect to a plurality of predefined input signal property sets of the electromagnetic signal to provide a tuned propagation profile of the meta-atoms in aggregate.

In some implementations, input signal properties of the electromagnetic signal are variable over time across the plurality of predefined input signal property sets, and the physical dimensions and the distribution of the meta-atoms are structurally tuned according to the tuned propagation profile to modulate the incoming electromagnetic wavefronts to focus a corresponding beam of the electromagnetic signal exiting the passive metasurface at a predefined beam pattern corresponding to the input signal property set as the input signal properties of the electromagnetic signal vary. In some implementations, the search operation 602 includes tuning a channel response of the passive metasurface to achieve a tuned receive signal power over a plurality of input signal property sets associated with the electromagnetic signal, the channel response being a function of the physical dimensions and the distribution of meta-atoms distributed across the passive metasurface across the plurality of predefined input signal property sets of the electromagnetic signal.

A manufacturing operation 604 forms the meta-atoms with the physical dimensions and the distribution determined by the search in one or more conductive layers and one or more dielectric substrates of the passive metasurface, each meta-atom being configured to modulate incoming electromagnetic wavefronts of the electromagnetic signal received by the meta-atom to form corresponding outgoing electromagnetic wavefronts of the electromagnetic signal exiting the passive metasurface, wherein the tuned propagation profile of the meta-atoms in aggregate supports the plurality of predefined input signal property sets of the incoming electromagnetic wavefronts and, for each input signal property set, the physical dimensions and the distribution of the meta-atoms are tuned according to the tuned propagation profile to modulate the incoming electromagnetic wavefronts to generate a predefined beam pattern of the electromagnetic signal exiting the passive metasurface corresponding to the input signal property set.

FIG. 7 illustrates example operations 700 for manufacturing a passive metasurface for interacting with an electromagnetic signal received at the passive metasurface from an electromagnetic signal transmitter A search operation 702 executes a search to tune physical dimensions and distribution of propagation elements of meta-atoms distributed in the passive metasurface with respect to a plurality of predefined input signal property sets of the electromagnetic signal to provide a tuned propagation profile of the meta-atoms in aggregate.

A manufacturing operation 704 forms the propagation elements of the meta-atoms with the physical dimensions and the distribution determined by the search in one or more conductive layers and one or more dielectric substrates of the passive metasurface. Each propagation element is configured to modulate incoming electromagnetic wavefronts of the electromagnetic signal received by the propagation element to form corresponding outgoing electromagnetic wavefronts of the electromagnetic signal exiting the passive metasurface, wherein the tuned propagation profile of the meta-atoms in aggregate supports the plurality of predefined input signal property sets of the incoming electromagnetic wavefronts. For each input signal property set, the physical dimensions and the distribution of the propagation elements are tuned according to the tuned propagation profile to modulate the incoming electromagnetic wavefronts to generate a predefined beam pattern of the electromagnetic signal exiting the passive metasurface corresponding to the input signal property set.

In some implementations, input signal properties of the electromagnetic signal are variable over time across the plurality of predefined input signal property sets and the physical dimensions and the distribution of the propagation elements are tuned according to the tuned propagation profile to modulate the incoming electromagnetic wavefronts to focus a corresponding beam of the electromagnetic signal exiting the passive metasurface as predefined beam patterns corresponding to the input signal property set as the input signal properties of the electromagnetic signal vary. Such variability may be selectively achieved by programming (e.g., into a phased array control system) codewords corresponding to different predefined input signal property sets so as to modify the input signal properties by changing the codeword.

In some applications, a channel response of the passive metasurface is tuned to achieve a tuned receive signal power over a plurality of input signal property sets associated with the electromagnetic signal, the channel response being a function of the physical dimensions and the distribution of propagation elements of meta-atoms distributed across the passive metasurface across the plurality of predefined input signal property sets of the electromagnetic signal.

In an uplink operation, a phased array functions as electromagnetic signal transmitter that transmits the electromagnetic signal to the passive metasurface according to a codeword of a codebook to generate the predefined beam pattern from the passive metasurface and the codeword corresponds to one of the predefined input signal property sets. In a downlink operation, a phased array functions as an electromagnetic signal receiver that receives the electromagnetic signal from the passive metasurface. In some implementations, each meta-atom includes at least a portion of a first propagation element corresponding to uplink operation in a first frequency band and at least a portion of a second propagation element corresponding to uplink operation in a second frequency band.

FIG. 8 illustrates example operations 800 for using a passive metasurface for interacting with an electromagnetic signal received at the passive metasurface from an electromagnetic signal transmitter. A receiving operation 802 receives the electromagnetic signal with input signal properties at the passive metasurface, wherein the input signal properties conform with a predefined input signal property set of a plurality of predefined input signal property sets. A modulating operation 804 modulates incoming electromagnetic wavefronts of the electromagnetic signal with propagation elements of meta-atoms formed in one or more conductive layers and one or more dielectric substrates of the passive metasurface. Each propagation element has physical dimensions and distribution in the passive metasurface. Each propagation element is configured to modulate incoming electromagnetic wavefronts of the electromagnetic signal received by the propagation element to form corresponding outgoing electromagnetic wavefronts of the electromagnetic signal exiting the passive metasurface, wherein tuned propagation profile of the meta-atoms in aggregate supports the plurality of predefined input signal property sets of the incoming electromagnetic wavefronts and, for each input signal property set, the physical dimensions and the distribution of the propagation elements are tuned according to the tuned propagation profile to modulate the incoming electromagnetic wavefronts to generate a predefined beam pattern of the electromagnetic signal exiting the passive metasurface corresponding to the input signal property set.

Figure 9:
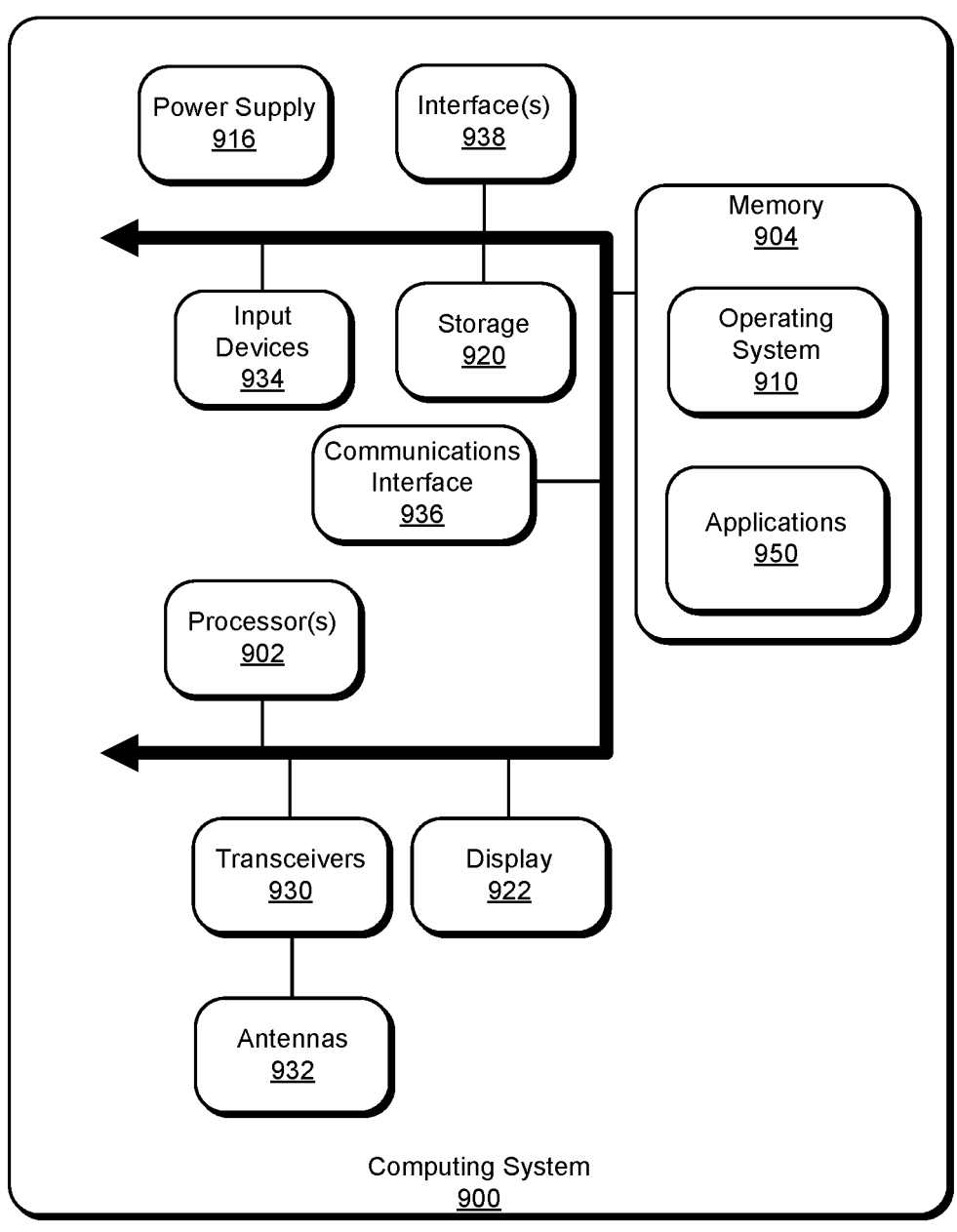
FIG. 9 illustrates elements of an example computing system for programmatically adjusting a gateway antenna and/or for designing a passive metasurface for use with a gateway antenna.

FIG. 9 illustrates elements of an example computing system 900 for programmatically adjusting a gateway antenna and/or for designing a passive metasurface for use with a gateway antenna. It should be understood that such a computing system may be more or less complicated than the computing system 900 shown in FIG. 9. For example, the one or more hardware processors and memory elements may be used to programmatically adjust a gateway antenna or other transmitters and/or receivers without relying on some or all of the other elements.

The computing system 900 may be a client device, such as a laptop, mobile device, desktop, tablet, or a server/cloud device. The computing system 900 includes one or more processor(s) 902, and a memory 904. The memory 904 generally includes both volatile memory (e.g., RAM) and nonvolatile memory (e.g., flash memory). An operating system 910 resides in the memory 904 and is executed by the processor(s) 902.

In an example computing system 900, as shown in FIG. 9, one or more modules or segments, such as applications 950, an RX antenna controller, a TX antenna controller, propagation element design and tuning code, and other program code and modules are loaded into the operating system 910 on the memory 904 and/or storage 920 and executed by processor(s) 902. The storage 920 may store antenna control parameters, physical dimensions of propagation elements, and other data and may be local to the computing system 900 or may be remote and communicatively connected to the computing system 900. In particular, in one implementation, components of the programmatic communication control may be implemented entirely in hardware or in a combination of hardware circuitry and software.

The computing system 900 includes a power supply 916, which is powered by one or more batteries or other power sources, and which provides power to other components of the computing system 900. The power supply 916 may also be connected to an external power source that overrides or recharges the built-in batteries or other power sources.

The computing system 900 may include one or more communication transceivers 930, which may be connected to one or more antenna(s) 932 to provide network connectivity (e.g., mobile phone network, Wi-Fi®, Bluetooth®) to one or more other servers and/or client devices (e.g., mobile devices, desktop computers, or laptop computers). The computing system 900 may further include a communications interface 936 (such as a network adapter or an I/O port, which are types of communication devices). The computing system 900 may use the adapter and any other types of communication devices for establishing connections over a wide-area network (WAN) or local-area network (LAN). It should be appreciated that the network connections shown are exemplary and that other communications devices and means for establishing a communications link between the computing system 900 and other devices may be used.

The computing system 900 may include one or more input devices 934 such that a user may enter commands and information (e.g., a keyboard or mouse). These and other input devices may be coupled to the server by one or more interfaces 938, such as a serial port interface, parallel port, or universal serial bus (USB). The computing system 900 may further include a display 922, such as a touchscreen display.

The computing system 900 may include a variety of tangible processor-readable storage media and intangible processor-readable communication signals. Tangible processor-readable storage can be embodied by any available media that can be accessed by the computing system 900 and can include both volatile and nonvolatile storage media and removable and non-removable storage media. Tangible processor-readable storage media excludes intangible communications signals (such as signals per se) and includes volatile and nonvolatile, removable, and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing system 900. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its properties set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Clause 1. A method of designing a passive metasurface for interacting with an electromagnetic signal received at the passive metasurface from an electromagnetic signal transmitter, the method comprising: executing a search to tune physical dimensions and distribution of meta-atoms distributed in the passive metasurface with respect to a plurality of predefined input signal property sets of the electromagnetic signal to provide a tuned propagation profile of the meta-atoms in aggregate; and forming the meta-atoms of the meta-atoms with the physical dimensions and the distribution determined by the search in one or more conductive layers and one or more dielectric substrates of the passive metasurface, each meta-atom being configured to modulate incoming electromagnetic wavefronts of the electromagnetic signal received by the meta-atom to form corresponding outgoing electromagnetic wavefronts of the electromagnetic signal exiting the passive metasurface, wherein the tuned propagation profile of the meta-atoms in aggregate supports the plurality of predefined input signal property sets of the incoming electromagnetic wavefronts and, for each input signal property set, the physical dimensions and the distribution of the meta-atoms are tuned according to the tuned propagation profile to modulate the incoming electromagnetic wavefronts to generate a predefined beam pattern of the electromagnetic signal exiting the passive metasurface corresponding to the input signal property set.

Clause 2. The method of clause 1, wherein input signal properties of the electromagnetic signal are variable over time across the plurality of predefined input signal property sets and the physical dimensions and the distribution of the meta-atoms are structurally tuned according to the tuned propagation profile to modulate the incoming electromagnetic wavefronts to focus a corresponding beam of the electromagnetic signal exiting the passive metasurface as predefined beam patterns corresponding to the input signal property set as the input signal properties of the electromagnetic signal vary.

Clause 3. The method of clause 1, wherein executing the search comprises: tuning a channel response of the passive metasurface to achieve a tuned receive signal power over a plurality of input signal property sets associated with the electromagnetic signal, the channel response being a function of the physical dimensions and the distribution of the meta-atoms across the passive metasurface across the plurality of predefined input signal property sets of the electromagnetic signal.

Clause 4. The method of clause 1, wherein each of the plurality of predefined input signal property sets includes an angle of incidence of an incoming beam of the electromagnetic signal.

Clause 5. The method of clause 1, wherein, in an uplink operation, a phased array functions as the electromagnetic signal transmitter that transmits the electromagnetic signal to the passive metasurface according to a codeword of a codebook to generate the predefined beam pattern toward the passive metasurface and the codeword corresponds to one of the predefined input signal property sets.

Clause 6. The method of clause 1, wherein, in a downlink operation, a phased array functions as an electromagnetic signal receiver that receives the electromagnetic signal from the passive metasurface.

Clause 7. The method of clause 1, wherein executing the search comprises: searching a meta-atom design template in the passive metasurface that satisfies a specific set of requirements or optimize a specific objective.

Clause 8. The method of clause 7, wherein the specific set of requirements includes transmittance ratio, range of supported incident angle, or range of phase shift offset introduced by a corresponding meta-atom.

Clause 9. The method of clause 7, wherein the search includes at least one of a genetic algorithm, Bayesian optimization, or simulated annealing.

Clause 10. The method of clause 7, wherein the meta-atom design template supports one or more links, each link using a separate frequency corresponding to a metallic pattern formed in each meta-atom, and each metallic pattern is usable for all frequencies, wherein relative positions of each metallic pattern are jointly searched to optimize the specific objective or satisfy the specific set of requirements.

Clause 11. The method of clause 1, wherein the passive metasurface is a component of a wireless networks including one or more of low earth orbit satellite networks, cellular networks, and Wi-Fi networks.

Clause 12. The method of clause 1, wherein a phased array functions as the electromagnetic signal transmitter that transmits the electromagnetic signal to the passive metasurface according to a codeword of a codebook to generate the predefined beam pattern toward the passive metasurface and the codeword corresponds to one of the predefined input signal property sets, wherein the codebook of the phased array and the meta-atoms of the passive metasurface are tuned to optimize a specific objective.

Clause 13. The method of clause 12, wherein the specific objective includes a function of signal-to-noise ratio (SNR) or sum capacity at a specified set of angles.

Clause 14. The method of clause 1, wherein a phased array functions as an electromagnetic signal receiver configured to receive the electromagnetic signal from the passive metasurface and the phased array and the meta-atoms of the passive metasurface are jointly tuned to optimize a specific objective.

Clause 15. The method of clause 14, wherein the specific objective includes a function of signal-to-noise ratio (SNR) or sum capacity at a specified set of angles.

Clause 16. A passive metasurface system for interacting with an electromagnetic signal received at the passive metasurface from an electromagnetic signal transmitter, the passive metasurface system comprising: a passive metasurface designed by executing a search to tune physical dimensions and distribution of meta-atoms distributed in the passive metasurface with respect to a plurality of predefined input signal property sets of the electromagnetic signal to provide a tuned propagation profile of the meta-atoms in aggregate, and manufactured by forming the meta-atoms of the meta-atoms with the physical dimensions and the distribution determined by the search in one or more conductive layers and one or more dielectric substrates of the passive metasurface, each meta-atom being configured to modulate incoming electromagnetic wavefronts of the electromagnetic signal received by the meta-atom to form corresponding outgoing electromagnetic wavefronts of the electromagnetic signal exiting the passive metasurface, wherein the tuned propagation profile of the meta-atoms in aggregate supports the plurality of predefined input signal property sets of the incoming electromagnetic wavefronts and, for each input signal property set, the physical dimensions and the distribution of the meta-atoms are tuned according to the tuned propagation profile to modulate the incoming electromagnetic wavefronts to generate a predefined beam pattern of the electromagnetic signal exiting the passive metasurface corresponding to the input signal property set.

Clause 17. The passive metasurface system of clause 16, wherein input signal properties of the electromagnetic signal are variable over time across the plurality of predefined input signal property sets and the physical dimensions and the distribution of the meta-atoms are structurally tuned according to the tuned propagation profile to modulate the incoming electromagnetic wavefronts to focus a corresponding beam of the electromagnetic signal exiting the passive metasurface as predefined beam patterns corresponding to the input signal property set as the input signal properties of the electromagnetic signal vary.

Clause 18. The passive metasurface system of clause 16, wherein the search includes tuning a channel response of the passive metasurface to achieve a tuned receive signal power over a plurality of input signal property sets associated with the electromagnetic signal, the channel response being a function of the physical dimensions and the distribution of the meta-atoms across the passive metasurface across the plurality of predefined input signal property sets of the electromagnetic signal.

Clause 19. The passive metasurface system of clause 16, wherein each of the plurality of predefined input signal property sets includes an angle of incidence of an incoming beam of the electromagnetic signal.

Clause 20. The passive metasurface system of clause 16, wherein, in an uplink operation, a phased array functions as the electromagnetic signal transmitter that transmits the electromagnetic signal to the passive metasurface according to a codeword of a codebook to generate the predefined beam pattern toward the passive metasurface and the codeword corresponds to one of the predefined input signal property sets.

Clause 21. The passive metasurface system of clause 16, wherein, in a downlink operation, a phased array functions as an electromagnetic signal receiver that receives the electromagnetic signal from the passive metasurface.

Clause 22. The passive metasurface system of clause 16, wherein the search includes searching a meta-atom design template in the passive metasurface that satisfies a specific set of requirements or optimize a specific objective.

Clause 23. The passive metasurface system of clause 22, wherein the specific set of requirements includes transmittance ratio, range of supported incident angle, or range of phase shift offset introduced by a corresponding meta-atom.

Clause 24. The passive metasurface system of clause 22, wherein the search includes at least one of a genetic algorithm, Bayesian optimization, or simulated annealing.

Clause 25. The passive metasurface system of clause 22, wherein the meta-atom design template supports one or more links, each link using a separate frequency corresponding to a metallic pattern formed in each meta-atom, and each metallic pattern is usable for all frequencies, wherein relative positions of each metallic pattern are jointly searched to optimize the specific objective or satisfy the specific set of requirements.

Clause 26. The passive metasurface system of clause 16, wherein the passive metasurface is a component of a wireless networks including one or more of low earth orbit satellite networks, cellular networks, and Wi-Fi networks.

Clause 27. The passive metasurface system of clause 16, wherein a phased array functions as the electromagnetic signal transmitter that transmits the electromagnetic signal to the passive metasurface according to a codeword of a codebook to generate the predefined beam pattern toward the passive metasurface and the codeword corresponds to one of the predefined input signal property sets, wherein the codebook of the phased array and the meta-atoms of the passive metasurface are tuned to optimize a specific objective.

Clause 28. The passive metasurface system of clause 27, wherein the specific objective includes a function of signal-to-noise ratio (SNR) or sum capacity at a specified set of angles.

Clause 29. The passive metasurface system of clause 16, wherein a phased array functions as an electromagnetic signal receiver configured to receive the electromagnetic signal from the passive metasurface and the phased array and the meta-atoms of the passive metasurface are jointly tuned to optimize a specific objective.

Clause 30. The passive metasurface system of clause 29, wherein the specific objective includes a function of signal-to-noise ratio (SNR) or sum capacity at a specified set of angles.

Clause 31. One or more tangible processor-readable storage media embodied with instructions for executing on one or more processors and circuits of a computing device a process for designing a passive metasurface for interacting with an electromagnetic signal received at the passive metasurface from an electromagnetic signal transmitter, the process comprising: executing a search to tune physical dimensions and distribution of meta-atoms distributed in the passive metasurface with respect to a plurality of predefined input signal property sets of the electromagnetic signal to provide a tuned propagation profile of the meta-atoms in aggregate; and forming the meta-atoms of the meta-atoms with the physical dimensions and the distribution determined by the search in one or more conductive layers and one or more dielectric substrates of the passive metasurface, each meta-atom being configured to modulate incoming electromagnetic wavefronts of the electromagnetic signal received by the meta-atom to form corresponding outgoing electromagnetic wavefronts of the electromagnetic signal exiting the passive metasurface, wherein the tuned propagation profile of the meta-atoms in aggregate supports the plurality of predefined input signal property sets of the incoming electromagnetic wavefronts and, for each input signal property set, the physical dimensions and the distribution of the meta-atoms are tuned according to the tuned propagation profile to modulate the incoming electromagnetic wavefronts to generate a predefined beam pattern of the electromagnetic signal exiting the passive metasurface corresponding to the input signal property set.

Clause 32. The one or more tangible processor-readable storage media of clause 31, wherein input signal properties of the electromagnetic signal are variable over time across the plurality of predefined input signal property sets and the physical dimensions and the distribution of the meta-atoms are structurally tuned according to the tuned propagation profile to modulate the incoming electromagnetic wavefronts to focus a corresponding beam of the electromagnetic signal exiting the passive metasurface as predefined beam patterns corresponding to the input signal property set as the input signal properties of the electromagnetic signal vary.

Clause 33. The one or more tangible processor-readable storage media of clause 31, wherein executing the search comprises: tuning a channel response of the passive metasurface to achieve a tuned receive signal power over a plurality of input signal property sets associated with the electromagnetic signal, the channel response being a function of the physical dimensions and the distribution of the meta-atoms across the passive metasurface across the plurality of predefined input signal property sets of the electromagnetic signal.

Clause 34. The one or more tangible processor-readable storage media of clause 31, wherein each of the plurality of predefined input signal property sets includes an angle of incidence of an incoming beam of the electromagnetic signal.

Clause 35. The one or more tangible processor-readable storage media of clause 31, wherein, in an uplink operation, a phased array functions as the electromagnetic signal transmitter that transmits the electromagnetic signal to the passive metasurface according to a codeword of a codebook to generate the predefined beam pattern toward the passive metasurface and the codeword corresponds to one of the predefined input signal property sets.

Clause 36. The one or more tangible processor-readable storage media of clause 31, wherein, in a downlink operation, a phased array functions as an electromagnetic signal receiver that receives the electromagnetic signal from the passive metasurface.

Clause 37. The one or more tangible processor-readable storage media of clause 31, wherein executing the search comprises: searching a meta-atom design template in the passive metasurface that satisfies a specific set of requirements or optimize a specific objective.

Clause 38. The one or more tangible processor-readable storage media of clause 37, wherein the specific set of requirements includes transmittance ratio, range of supported incident angle, or range of phase shift offset introduced by a corresponding meta-atom.

Clause 39. The one or more tangible processor-readable storage media of clause 37, wherein the search includes at least one of a genetic algorithm, Bayesian optimization, or simulated annealing.

Clause 40. The one or more tangible processor-readable storage media of clause 37, wherein the meta-atom design template supports one or more links, each link using a separate frequency corresponding to a metallic pattern formed in each meta-atom, and each metallic pattern is usable for all frequencies, wherein relative positions of each metallic pattern are jointly searched to optimize the specific objective or satisfy the specific set of requirements.

Clause 41. The one or more tangible processor-readable storage media of clause 31, wherein the passive metasurface is a component of a wireless networks including one or more of low earth orbit satellite networks, cellular networks, and Wi-Fi networks.

Clause 42. The one or more tangible processor-readable storage media of clause 31, wherein a phased array functions as the electromagnetic signal transmitter that transmits the electromagnetic signal to the passive metasurface according to a codeword of a codebook to generate the predefined beam pattern toward the passive metasurface and the codeword corresponds to one of the predefined input signal property sets, wherein the codebook of the phased array and the meta-atoms of the passive metasurface are tuned to optimize a specific objective.

Clause 43. The one or more tangible processor-readable storage media of clause 42, wherein the specific objective includes a function of signal-to-noise ratio (SNR) or sum capacity at a specified set of angles.

Clause 44. The one or more tangible processor-readable storage media of clause 31, wherein a phased array functions as an electromagnetic signal receiver configured to receive the electromagnetic signal from the passive metasurface and the phased array and the meta-atoms of the passive metasurface are jointly tuned to optimize a specific objective.

Clause 45. The one or more tangible processor-readable storage media of clause 44, wherein the specific objective includes a function of signal-to-noise ratio (SNR) or sum capacity at a specified set of angles.

Clause 46. A method of manufacturing a passive metasurface for interacting with an electromagnetic signal received at the passive metasurface from an electromagnetic signal transmitter, the method comprising: executing a search to tune physical dimensions and distribution of propagation elements of meta-atoms distributed in the passive metasurface with respect to a plurality of predefined input signal property sets of the electromagnetic signal to provide a tuned propagation profile of the meta-atoms in aggregate; and forming the propagation elements of the meta-atoms with the physical dimensions and the distribution determined by the search in one or more conductive layers and one or more dielectric substrates of the passive metasurface, each propagation element being configured to modulate incoming electromagnetic wavefronts of the electromagnetic signal received by the propagation element to form corresponding outgoing electromagnetic wavefronts of the electromagnetic signal exiting the passive metasurface, wherein the tuned propagation profile of the meta-atoms in aggregate supports the plurality of predefined input signal property sets of the incoming electromagnetic wavefronts and, for each input signal property set, the physical dimensions and the distribution of the propagation elements are tuned according to the tuned propagation profile to modulate the incoming electromagnetic wavefronts to generate a predefined beam pattern of the electromagnetic signal exiting the passive metasurface corresponding to the input signal property set.

Clause 47. The method of clause 46, wherein input signal properties of the electromagnetic signal are variable over time across the plurality of predefined input signal property sets and the physical dimensions and the distribution of the propagation elements are tuned according to the tuned propagation profile the incoming electromagnetic wavefronts to focus a corresponding beam of the electromagnetic signal exiting the passive metasurface as predefined beam patterns corresponding to the input signal property set as the input signal properties of the electromagnetic signal vary.

Clause 48. The method of clause 46, wherein executing a search comprises: tuning a channel response of the passive metasurface to achieve a tuned receive signal power over a plurality of input signal property sets associated with the electromagnetic signal, the channel response being a function of the physical dimensions and the distribution of propagation elements of meta-atoms distributed across the passive metasurface across the plurality of predefined input signal property sets of the electromagnetic signal.

Clause 49. The method of clause 46, wherein each of the plurality of predefined input signal property sets includes a phase of an incoming beam of the electromagnetic signal.

Clause 50. The method of clause 46, wherein each of the plurality of predefined input signal property sets includes an angle of incidence of an incoming beam of the electromagnetic signal.

Clause 51. The method of clause 46, wherein each propagation element transmits the electromagnetic signal through the passive metasurface.

Clause 52. The method of clause 46, wherein each propagation element reflects the electromagnetic signal from the passive metasurface.

Clause 53. The method of clause 46, wherein, in an uplink operation, a phased array functions as the electromagnetic signal transmitter that transmits the electromagnetic signal to the passive metasurface according to a codeword of a codebook to generate the predefined beam pattern from the passive metasurface and the codeword corresponds to one of the predefined input signal property sets.

Clause 54. The method of clause 46, wherein, in a downlink operation, a phased array functions as an electromagnetic signal receiver that receives the electromagnetic signal from the passive metasurface.

Clause 55. The method of clause 46, wherein each meta-atom includes at least a portion of a first propagation element corresponding to uplink operation in a first frequency band and at least a portion of a second propagation element corresponding to uplink operation in a second frequency band.

Clause 56. A passive metasurface for interacting with an electromagnetic signal received at the passive metasurface from an electromagnetic signal transmitter, the passive metasurface comprising: one or more dielectric substrates; one or more conductive layers applied to each of the one or more dielectric substrates; and meta-atoms distributed in the passive metasurface to provide a tuned propagation profile of the meta-atoms in aggregate, each meta-atom including at least a portion of a propagation element formed in the one or more conductive layers and the one or more dielectric substrates, each propagation element interacting with the electromagnetic signal to modulate incoming electromagnetic wavefronts of the electromagnetic signal received by the propagation element to form corresponding outgoing electromagnetic wavefronts of the electromagnetic signal exiting the passive metasurface, wherein the tuned propagation profile of the meta-atoms in aggregate supports a plurality of predefined input signal property sets of the incoming electromagnetic wavefronts and, for each input signal property set, physical dimensions and distribution of the propagation elements in the passive metasurface are tuned according to the tuned propagation profile to modulate the incoming electromagnetic wavefronts to generate a predefined beam pattern of the electromagnetic signal exiting the passive metasurface corresponding to the input signal property set.

Clause 57. The passive metasurface of clause 56, wherein input signal properties of the electromagnetic signal are variable over time across the plurality of predefined input signal property sets and the physical dimensions and the distribution of the propagation elements are tuned according to the tuned propagation profile to modulate the incoming electromagnetic wavefronts to focus a corresponding beam of the electromagnetic signal exiting the passive metasurface as predefined beam patterns corresponding to the input signal property set as the input signal properties of the electromagnetic signal vary.

Clause 58. The passive metasurface of clause 56, wherein a channel response of the passive metasurface is tuned to achieve a tuned receive signal power over a plurality of input signal property sets associated with the electromagnetic signal, the channel response being a function of the physical dimensions and the distribution of propagation elements of meta-atoms distributed across the passive metasurface across the plurality of predefined input signal property sets of the electromagnetic signal.

Clause 59. The passive metasurface of clause 56, wherein each of the plurality of predefined input signal property sets includes a phase of an incoming beam of the electromagnetic signal.

Clause 60. The passive metasurface of clause 56, wherein each of the plurality of predefined input signal property sets includes an angle of incidence of an incoming beam of the electromagnetic signal.

Clause 61. The passive metasurface of clause 56, wherein each propagation element transmits the electromagnetic signal through the passive metasurface.

Clause 62. The passive metasurface of clause 56, wherein each propagation element reflects the electromagnetic signal from the passive metasurface.

Clause 63. The passive metasurface of clause 56, wherein, in an uplink operation, a phased array functions as electromagnetic signal transmitter that transmits the electromagnetic signal to the passive metasurface according to a codeword of a codebook to generate the predefined beam pattern from the passive metasurface and the codeword corresponds to one of the predefined input signal property sets.

Clause 64. The passive metasurface of clause 56, wherein, in a downlink operation, a phased array functions as an electromagnetic signal receiver that receives the electromagnetic signal from the passive metasurface.

Clause 65. The passive metasurface of clause 56, wherein each meta-atom includes at least a portion of a first propagation element corresponding to uplink operation in a first frequency band and at least a portion of a second propagation element corresponding to uplink operation in a second frequency band.

Clause 66. A method of using a passive metasurface for interacting with an electromagnetic signal received at the passive metasurface from an electromagnetic signal transmitter, the method comprising: receiving the electromagnetic signal with input signal properties at the passive metasurface, wherein the input signal properties conform with a predefined input signal property set of a plurality of predefined input signal property sets; and modulating incoming electromagnetic wavefronts of the electromagnetic signal with propagation elements of meta-atoms formed in one or more conductive layers and one or more dielectric substrates of the passive metasurface, wherein each propagation element has physical dimensions and distribution in the passive metasurface, each propagation element being configured to modulate incoming electromagnetic wavefronts of the electromagnetic signal received by the propagation element to form corresponding outgoing electromagnetic wavefronts of the electromagnetic signal exiting the passive metasurface, wherein tuned propagation profile of the meta-atoms in aggregate supports the plurality of predefined input signal property sets of the incoming electromagnetic wavefronts and, for each input signal property set, the physical dimensions and the distribution of the propagation elements are tuned according to the tuned propagation profile to modulate the incoming electromagnetic wavefronts to generate a predefined beam pattern of the electromagnetic signal exiting the passive metasurface corresponding to the input signal property set.

Clause 67. The method of clause 66, wherein the input signal properties of the electromagnetic signal are variable over time across the plurality of predefined input signal property sets and the physical dimensions and the distribution of the propagation elements are tuned according to the tuned propagation profile to modulate the incoming electromagnetic wavefronts to focus a corresponding beam of the electromagnetic signal exiting the passive metasurface as predefined beam patterns corresponding to the input signal property set as the input signal properties of the electromagnetic signal vary.

Clause 68. The method of clause 66, wherein each of the plurality of predefined input signal property sets includes a phase of an incoming beam of the electromagnetic signal.

Clause 69. The method of clause 66, wherein each of the plurality of predefined input signal property sets includes an angle of incidence of an incoming beam of the electromagnetic signal.

Clause 70. The method of clause 66, wherein each propagation element transmits the electromagnetic signal through the passive metasurface.

Clause 71 The method of clause 66, wherein each propagation element reflects the electromagnetic signal from the passive metasurface.

Clause 72. The method of clause 66, wherein the physical dimensions and the distribution of the propagation elements in the passive metasurface are structurally tuned according to a search executed to jointly optimize the tuned propagation profile of the meta-atoms in relation to a codebook of a phased array functioning as the electromagnetic signal transmitter or an electromagnetic receiver.

Clause 73. The method of clause 66, wherein, in an uplink operation, a phased array functions as electromagnetic signal transmitter that transmits the electromagnetic signal to the passive metasurface according to a codeword of a codebook to generate the predefined beam pattern from the passive metasurface and the codeword corresponds to one of the predefined input signal property sets.

Clause 74. The method of clause 66, wherein, in a downlink operation, a phased array functions as electromagnetic signal receiver that receives the electromagnetic signal from the passive metasurface.

Clause 75. The method of clause 66, wherein each meta-atom includes at least a portion of a first propagation element corresponding to uplink operation in a first frequency band and at least a portion of a second propagation element corresponding to uplink operation in a second frequency band.

Clause 76. A passive metasurface for interacting with an electromagnetic signal received at the passive metasurface from an electromagnetic signal transmitter, the passive metasurface comprising: one or more dielectric substrates; one or more conductive layers applied to each of the one or more dielectric substrates; and meta-atoms distributed in the passive metasurface to provide a tuned propagation profile of the meta-atoms in aggregate, each meta-atom including at least a portion of a propagation element formed in the one or more conductive layers and the one or more dielectric substrates, each propagation element interacting with the electromagnetic signal to modulate incoming electromagnetic wavefronts of the electromagnetic signal received by the propagation element to form corresponding outgoing electromagnetic wavefronts of the electromagnetic signal exiting the passive metasurface, wherein the tuned propagation profile of the meta-atoms in aggregate supports a plurality of predefined input signal property sets of the incoming electromagnetic wavefronts and, for each input signal property set, physical dimensions and distribution of the propagation elements in the passive metasurface are tuned according to the tuned propagation profile to modulate the incoming electromagnetic wavefronts to generate a predefined beam pattern of the electromagnetic signal exiting the passive metasurface corresponding to the input signal property set, wherein the physical dimensions and the distribution of the propagation elements in the passive metasurface are tuned according to a search executed to jointly optimize the tuned propagation profile of the meta-atoms in relation to a codebook of a phased array functioning as the electromagnetic signal transmitter or an electromagnetic receiver.

Clause 77. The passive metasurface of clause 76, wherein, in an uplink operation, the phased array functions as electromagnetic signal transmitter that transmits the electromagnetic signal to the passive metasurface according to a codeword of the codebook to generate the predefined beam pattern from the passive metasurface and the codeword corresponds to one of the predefined input signal property sets.

Clause 78. The passive metasurface of clause 76, wherein, in a downlink operation, the phased array functions as electromagnetic signal receiver that receives the electromagnetic signal from the passive metasurface.

Clause 79. A system for designing a passive metasurface for interacting with an electromagnetic signal received at the passive metasurface from an electromagnetic signal transmitter, the system comprising: means for executing a search to tune physical dimensions and distribution of propagation elements of meta-atoms distributed in the passive metasurface with respect to a plurality of predefined input signal property sets of the electromagnetic signal to provide a tuned propagation profile of the meta-atoms in aggregate; and means for forming the propagation elements of the meta-atoms with the physical dimensions and the distribution determined by the search in one or more conductive layers and one or more dielectric substrates of the passive metasurface, each propagation element being configured to modulate incoming electromagnetic wavefronts of the electromagnetic signal received by the propagation element to form corresponding outgoing electromagnetic wavefronts of the electromagnetic signal exiting the passive metasurface, wherein the tuned propagation profile of the meta-atoms in aggregate supports the plurality of predefined input signal property sets of the incoming electromagnetic wavefronts and, for each input signal property set, the physical dimensions and the distribution of the propagation elements are tuned according to the tuned propagation profile to modulate the incoming electromagnetic wavefronts to generate a predefined beam pattern of the electromagnetic signal exiting the passive metasurface corresponding to the input signal property set.

Clause 80. The system of clause 79, wherein input signal properties of the electromagnetic signal are variable over time across the plurality of predefined input signal property sets and the physical dimensions and the distribution of the propagation elements are structurally tuned according to the tuned propagation profile to modulate the incoming electromagnetic wavefronts to focus a corresponding beam of the electromagnetic signal exiting the passive metasurface as predefined beam patterns corresponding to the input signal property set as the input signal properties of the electromagnetic signal vary.

Clause 81. The system of clause 79, wherein means for executing the search comprises: means for tuning a channel response of the passive metasurface to achieve a tuned receive signal power over a plurality of input signal property sets associated with the electromagnetic signal, the channel response being a function of the physical dimensions and the distribution of the meta-atoms across the passive metasurface across the plurality of predefined input signal property sets of the electromagnetic signal.

Clause 82. The system of clause 79, wherein each of the plurality of predefined input signal property sets includes an angle of incidence of an incoming beam of the electromagnetic signal.

Clause 83. The system of clause 79, wherein, in an uplink operation, a phased array functions as the electromagnetic signal transmitter that transmits the electromagnetic signal to the passive metasurface according to a codeword of a codebook to generate the predefined beam pattern toward the passive metasurface and the codeword corresponds to one of the predefined input signal property sets.

Clause 84. The system of clause 79, wherein, in a down-link operation, a phased array functions as an electromagnetic signal receiver that receives the electromagnetic signal from the passive metasurface.

Clause 85. The system of clause 79, wherein means for executing the search comprises: means for searching a meta-atom design template in the passive metasurface that satisfies a specific set of requirements or optimize a specific objective.

Clause 86. The system of clause 85, wherein the specific set of requirements includes transmittance ratio, range of supported incident angle, or range of phase shift offset introduced by a corresponding meta-atom.

Clause 87. The system of clause 85, wherein the search includes at least one of a genetic algorithm, Bayesian optimization, or simulated annealing.

Clause 88. The system of clause 85, wherein the meta-atom design template supports one or more links, each link using a separate frequency corresponding to a metallic pattern formed in each meta-atom, and each metallic pattern is usable for all frequencies, wherein relative positions of each metallic pattern are jointly searched to optimize the specific objective or satisfy the specific set of requirements.

Clause 89. The system of clause 79, wherein the passive metasurface is a component of a wireless networks including one or more of low earth orbit satellite networks, cellular networks, and Wi-Fi networks.

Clause 90. The system of clause 79, wherein a phased array functions as the electromagnetic signal transmitter that transmits the electromagnetic signal to the passive metasurface according to a codeword of a codebook to generate the predefined beam pattern toward the passive metasurface and the codeword corresponds to one of the predefined input signal property sets, wherein the codebook of the phased array and the meta-atoms of the passive metasurface are tuned to optimize a specific objective.

Clause 91. The system of clause 90, wherein the specific objective includes a function of signal-to-noise ratio (SNR) or sum capacity at a specified set of angles.

Clause 92 The system of clause 79, wherein a phased array functions as an electromagnetic signal receiver configured to receive the electromagnetic signal from the passive metasurface and the phased array and the meta-atoms of the passive metasurface are jointly tuned to optimize a specific objective.

Clause 93. The system of clause 92, wherein the specific objective includes a function of signal-to-noise ratio (SNR) or sum capacity at a specified set of angles.

Clause 94. A system for manufacturing a passive metasurface for interacting with an electromagnetic signal received at the passive metasurface from an electromagnetic signal transmitter, the passive metasurface comprising: means for executing a search to tune physical dimensions and distribution of propagation elements of meta-atoms distributed in the passive metasurface with respect to a plurality of predefined input signal property sets of the electromagnetic signal to provide a tuned propagation profile of the meta-atoms in aggregate, wherein the propagation elements of the meta-atoms with the physical dimensions and the distribution determined by the search in one or more conductive layers and one or more dielectric substrates of the passive metasurface, each propagation element being configured to modulate incoming electromagnetic wavefronts of the electromagnetic signal received by the propagation element to form corresponding outgoing electromagnetic wavefronts of the electromagnetic signal exiting the passive metasurface, wherein the tuned propagation profile of the meta-atoms in aggregate supports the plurality of predefined input signal property sets of the incoming electromagnetic wavefronts and, for each input signal property set, the physical dimensions and the distribution of the propagation elements are tuned according to the tuned propagation profile to modulate the incoming electromagnetic wavefronts to generate a predefined beam pattern of the electromagnetic signal exiting the passive metasurface corresponding to the input signal property set.

Clause 95. The system of clause 94, wherein input signal properties of the electromagnetic signal are variable over time across the plurality of predefined input signal property sets and the physical dimensions and the distribution of the propagation elements are tuned according to the tuned propagation profile the incoming electromagnetic wavefronts to focus a corresponding beam of the electromagnetic signal exiting the passive metasurface as predefined beam patterns corresponding to the input signal property set as the input signal properties of the electromagnetic signal vary.

Clause 96. The system of clause 94, wherein executing a search comprises: tuning a channel response of the passive metasurface to achieve a tuned receive signal power over a plurality of input signal property sets associated with the electromagnetic signal, the channel response being a function of the physical dimensions and the distribution of propagation elements of meta-atoms distributed across the passive metasurface across the plurality of predefined input signal property sets of the electromagnetic signal.

Clause 97. The system of clause 94, wherein each of the plurality of predefined input signal property sets includes a phase of an incoming beam of the electromagnetic signal.

Clause 98. The system of clause 94, wherein each of the plurality of predefined input signal property sets includes an angle of incidence of an incoming beam of the electromagnetic signal.

Clause 99. The system of clause 94, wherein each propagation element transmits the electromagnetic signal through the passive metasurface.

Clause 100. The system of clause 94, wherein each propagation element reflects the electromagnetic signal from the passive metasurface.

Clause 101. The system of clause 94, wherein, in an uplink operation, a phased array functions as the electromagnetic signal transmitter that transmits the electromagnetic signal to the passive metasurface according to a codeword of a codebook to generate the predefined beam pattern from the passive metasurface and the codeword corresponds to one of the predefined input signal property sets.

Clause 102. The system of clause 94, wherein, in a downlink operation, a phased array functions as an electromagnetic signal receiver that receives the electromagnetic signal from the passive metasurface.

Clause 103. A system for using passive metasurface to interact with an electromagnetic signal received at the passive metasurface from an electromagnetic signal transmitter, the system comprising: means for receiving the electromagnetic signal with input signal properties at the passive metasurface, wherein the input signal properties conform with a predefined input signal property set of a plurality of predefined input signal property sets; and modulating incoming electromagnetic wavefronts of the electromagnetic signal with propagation elements of meta-atoms formed in one or more conductive layers and one or more dielectric substrates of the passive metasurface, wherein each propagation element has physical dimensions and distribution in the passive metasurface, each propagation element being configured to modulate incoming electromagnetic wavefronts of the electromagnetic signal received by the propagation element to form corresponding outgoing electromagnetic wavefronts of the electromagnetic signal exiting the passive metasurface, wherein tuned propagation profile of the meta-atoms in aggregate supports the plurality of predefined input signal property sets of the incoming electromagnetic wavefronts and, for each input signal property set, the physical dimensions and the distribution of the propagation elements are tuned according to the tuned propagation profile to modulate the incoming electromagnetic wavefronts to generate a predefined beam pattern of the electromagnetic signal exiting the passive metasurface corresponding to the input signal property set.

Clause 104. The system of clause 103, wherein the input signal properties of the electromagnetic signal are variable over time across the plurality of predefined input signal property sets and the physical dimensions and the distribution of the propagation elements are tuned according to the tuned propagation profile to modulate the incoming electromagnetic wavefronts to focus a corresponding beam of the electromagnetic signal exiting the passive metasurface as predefined beam patterns corresponding to the input signal property set as the input signal properties of the electromagnetic signal vary.

Clause 105. The system of clause 103, wherein each of the plurality of predefined input signal property sets includes a phase of an incoming beam of the electromagnetic signal.

Clause 106. The system of clause 103, wherein each of the plurality of predefined input signal property sets includes an angle of incidence of an incoming beam of the electromagnetic signal.

Clause 107. The system of clause 103, wherein each propagation element transmits the electromagnetic signal through the passive metasurface.

Clause 108. The system of clause 103, wherein each propagation element reflects the electromagnetic signal from the passive metasurface.

Clause 109. The system of clause 103, wherein the physical dimensions and the distribution of the propagation elements in the passive metasurface are structurally tuned according to a search executed to jointly optimize the tuned propagation profile of the meta-atoms in relation to a codebook of a phased array functioning as the electromagnetic signal transmitter or an electromagnetic receiver.

Clause 110. The system of clause 103, wherein, in an uplink operation, a phased array functions as electromagnetic signal transmitter that transmits the electromagnetic signal to the passive metasurface according to a codeword of a codebook to generate the predefined beam pattern from the passive metasurface and the codeword corresponds to one of the predefined input signal property sets.

Clause 111. The system of clause 103, wherein, in a downlink operation, a phased array functions as electromagnetic signal receiver that receives the electromagnetic signal from the passive metasurface.

Some implementations may comprise an article of manufacture, which excludes software per se. An article of manufacture may comprise a tangible storage medium to store logic and/or data. Examples of a storage medium may include one or more types of computer-readable storage media capable of storing electronic data, including volatile memory or nonvolatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable types of code, such as source code, compiled code, interpreted code, executable code, static code, dynamic code, and the like. The executable computer program instructions may be implemented according to a predefined computer language, manner, or syntax, for instructing a computer to perform a certain operation segment. The instructions may be implemented using any suitable high-level, low-level, object-oriented, visual, compiled, and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order unless explicitly claimed otherwise or a specific order is inherently necessitated by the claim language.

What is claimed is:

1. A method of designing a passive metasurface for interacting with an electromagnetic signal received at the passive metasurface from an electromagnetic signal transmitter, the method comprising:

executing a search to tune physical dimensions and distribution of meta-atoms distributed in the passive metasurface with respect to a plurality of predefined input signal property sets of the electromagnetic signal to provide a tuned propagation profile of the meta-atoms in aggregate; and forming the meta-atoms with the physical dimensions and the distribution determined by the search in one or more conductive layers and one or more dielectric substrates of the passive metasurface, each meta-atom being configured to modulate incoming electromagnetic wavefronts of the electromagnetic signal received by the meta-atom to form corresponding outgoing electromagnetic wavefronts of the electromagnetic signal exiting the passive metasurface, wherein the tuned propagation profile of the meta-atoms in aggregate supports the plurality of predefined input signal property sets of the incoming electromagnetic wavefronts at a first side of the passive metasurface and, for each input signal property set, the physical dimensions and the distribution of the meta-atoms are tuned according to the tuned propagation profile to modulate the incoming electromagnetic wavefronts to generate a predefined beam pattern of the electromagnetic signal exiting an opposing side of the passive metasurface corresponding to the input signal property set.

2. The method of claim 1, wherein input signal properties of the electromagnetic signal are variable over time across the plurality of predefined input signal property sets and the physical dimensions and the distribution of the meta-atoms are structurally tuned according to the tuned propagation profile to modulate the incoming electromagnetic wavefronts to focus a corresponding beam of the electromagnetic signal exiting the passive metasurface as predefined beam patterns corresponding to the input signal property set as the input signal properties of the electromagnetic signal vary.

3. The method of claim 1, wherein executing the search comprises:

tuning a channel response of the passive metasurface to achieve a tuned receive signal power over a plurality of input signal property sets associated with the electromagnetic signal, the channel response being a function of the physical dimensions and the distribution of the meta-atoms across the passive metasurface across the plurality of predefined input signal property sets of the electromagnetic signal.

4. The method of claim 1, wherein each of the plurality of predefined input signal property sets includes an angle of incidence of an incoming beam of the electromagnetic signal.

5. The method of claim 1, wherein, in an uplink operation, a phased array functions as the electromagnetic signal transmitter that transmits the electromagnetic signal to the passive metasurface according to a codeword of a codebook to generate the predefined beam pattern toward the passive metasurface and the codeword corresponds to one of the predefined input signal property sets.

6. The method of claim 1, wherein, in a downlink operation, a phased array functions as an electromagnetic signal receiver that receives the electromagnetic signal from the passive metasurface.

7. The method of claim 1, wherein executing the search comprises:

searching a meta-atom design template in the passive metasurface that satisfies a specific set of requirements or optimize a specific objective.

8. The method of claim 7, wherein the specific set of requirements includes transmittance ratio, range of supported incident angle, or range of phase shift offset introduced by a corresponding meta-atom.

9. The method of claim 7, wherein the meta-atom design template supports one or more links, each link using a separate frequency corresponding to a metallic pattern formed in each meta-atom, and each metallic pattern is usable for all frequencies, wherein relative positions of each metallic pattern are jointly searched to optimize the specific objective or satisfy the specific set of requirements.

10. The method of claim 1, wherein a phased array functions as the electromagnetic signal transmitter that transmits the electromagnetic signal to the passive metasurface according to a codeword of a codebook to generate the predefined beam pattern toward the passive metasurface and the codeword corresponds to one of the predefined input signal property sets, wherein the codebook of the phased array and the meta-atoms of the passive metasurface are tuned to optimize a specific objective.

11. The method of claim 1, wherein a phased array functions as an electromagnetic signal receiver configured to receive the electromagnetic signal from the passive metasurface and the phased array and the meta-atoms of the passive metasurface are jointly tuned to optimize a specific objective.

12. A passive metasurface system for interacting with an electromagnetic signal received from an electromagnetic signal transmitter, the passive metasurface system comprising: a passive metasurface designed by executing a search to tune physical dimensions and distribution of meta-atoms distributed in the passive metasurface with respect to a plurality of predefined input signal property sets of the electromagnetic signal to provide a tuned propagation profile of the meta-atoms in aggregate, and manufactured by forming the meta-atoms with the physical dimensions and the distribution determined by the search in one or more conductive layers and one or more dielectric substrates of the passive metasurface, each meta-atom being configured to modulate incoming electromagnetic wavefronts of the electromagnetic signal received by the meta-atom to form corresponding outgoing electromagnetic wavefronts of the electromagnetic signal exiting the passive metasurface, wherein the tuned propagation profile of the meta-atoms in aggregate supports the plurality of predefined input signal property sets of the incoming electromagnetic wavefronts at a first side of the passive metasurface and, for each input signal property set, the physical dimensions and the distribution of the meta-atoms are tuned according to the tuned propagation profile to modulate the incoming electromagnetic wavefronts to generate a predefined beam pattern of the electromagnetic signal exiting an opposing side of the passive metasurface corresponding to the input signal property set.

13. A passive metasurface for interacting with an electromagnetic signal received at the passive metasurface from an electromagnetic signal transmitter, the passive metasurface comprising:

one or more dielectric substrates;

one or more conductive layers applied to each of the one or more dielectric substrates; and meta-atoms distributed in the passive metasurface to provide a tuned propagation profile of the meta-atoms in aggregate, each meta-atom including at least a portion of a propagation element formed in the one or more conductive layers and the one or more dielectric substrates, each propagation element interacting with the electromagnetic signal to modulate incoming electromagnetic wavefronts of the electromagnetic signal received by the propagation element to form corresponding outgoing electromagnetic wavefronts of the electromagnetic signal exiting the passive metasurface, wherein the tuned propagation profile of the meta-atoms in aggregate supports a plurality of predefined input signal property sets of the incoming electromagnetic wavefronts at a first side of the passive metasurface and, for each input signal property set, physical dimensions and distribution of the propagation elements in the passive metasurface are tuned according to the tuned propagation profile to modulate the incoming electromagnetic wavefronts to generate a predefined beam pattern of the electromagnetic signal exiting an opposing side of the passive metasurface corresponding to the input signal property set.

14. The passive metasurface of claim 13, wherein input signal properties of the electromagnetic signal are variable over time across the plurality of predefined input signal property sets and the physical dimensions and the distribution of the propagation elements are tuned according to the tuned propagation profile to modulate the incoming electromagnetic wavefronts to focus a corresponding beam of the electromagnetic signal exiting the passive metasurface as predefined beam patterns corresponding to the input signal property set as the input signal properties of the electromagnetic signal vary.

15. The passive metasurface of claim 13, wherein a channel response of the passive metasurface is tuned to achieve a tuned receive signal power over a plurality of input signal property sets associated with the electromagnetic signal, the channel response being a function of the physical dimensions and the distribution of propagation elements of meta-atoms distributed across the passive metasurface across the plurality of predefined input signal property sets of the electromagnetic signal.

16. The passive metasurface of claim 13, wherein each of the plurality of predefined input signal property sets includes a phase of an incoming beam of the electromagnetic signal.

17. The passive metasurface of claim 13, wherein each of the plurality of predefined input signal property sets includes an angle of incidence of an incoming beam of the electromagnetic signal.

18. The passive metasurface of claim 13, wherein, in an uplink operation, a phased array functions as electromagnetic signal transmitter that transmits the electromagnetic signal to the passive metasurface according to a codeword of a codebook to generate the predefined beam pattern from the passive metasurface and the codeword corresponds to one of the predefined input signal property sets.

19. The passive metasurface of claim 13, wherein, in a downlink operation, a phased array functions as an electromagnetic signal receiver that receives the electromagnetic signal from the passive metasurface.

20. The passive metasurface of claim 13, wherein each meta-atom includes at least a portion of a first propagation element corresponding to uplink operation in a first frequency band and at least a portion of a second propagation element corresponding to uplink operation in a second frequency band.

* * * * *